(12) United States Patent
Carlin et al.

(10) Patent No.: US 10,867,266 B1
(45) Date of Patent: Dec. 15, 2020

(54) ACTIVE CONFIGURATOR

(71) Applicant: SIGNIFY HOLDING B.V., Eindhoven (NL)

(72) Inventors: Dennis W. Carlin, Sharpsburg, GA (US); John S. Hill, Hampton, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 601 days.

(21) Appl. No.: 15/602,676

(22) Filed: May 23, 2017

(51) Int. Cl.
*G06Q 10/06* (2012.01)
*G06Q 10/08* (2012.01)

(52) U.S. Cl.
CPC ..... *G06Q 10/06315* (2013.01); *G06Q 10/087* (2013.01)

(58) Field of Classification Search
CPC .... G09G 3/08; G06F 17/5004; G08B 27/005; G08B 21/02; G08B 19/00
See application file for complete search history.

(56) References Cited

U.S. PATENT DOCUMENTS

| 2010/0188245 | A1* | 7/2010 | Nielsen | G01V 3/08 340/686.1 |
| 2018/0121571 | A1* | 5/2018 | Tiwari | G06Q 10/10 |

* cited by examiner

*Primary Examiner* — Rutao Wu
*Assistant Examiner* — Zahra Elkassabgi

(57) ABSTRACT

An active configurator can include an interface and a controller coupled to the interface. The controller of the active configurator can receive a number of inputs, via the interface, from a user, wherein the inputs are associated with a proposed installation. The controller of the active configurator can also evaluate the inputs using at least one external system communicably coupled to the controller. The controller of the active configurator can also present, using the interface, the inputs in a graphical format, wherein the graphical format presents a physical representation of the proposed installation.

20 Claims, 14 Drawing Sheets

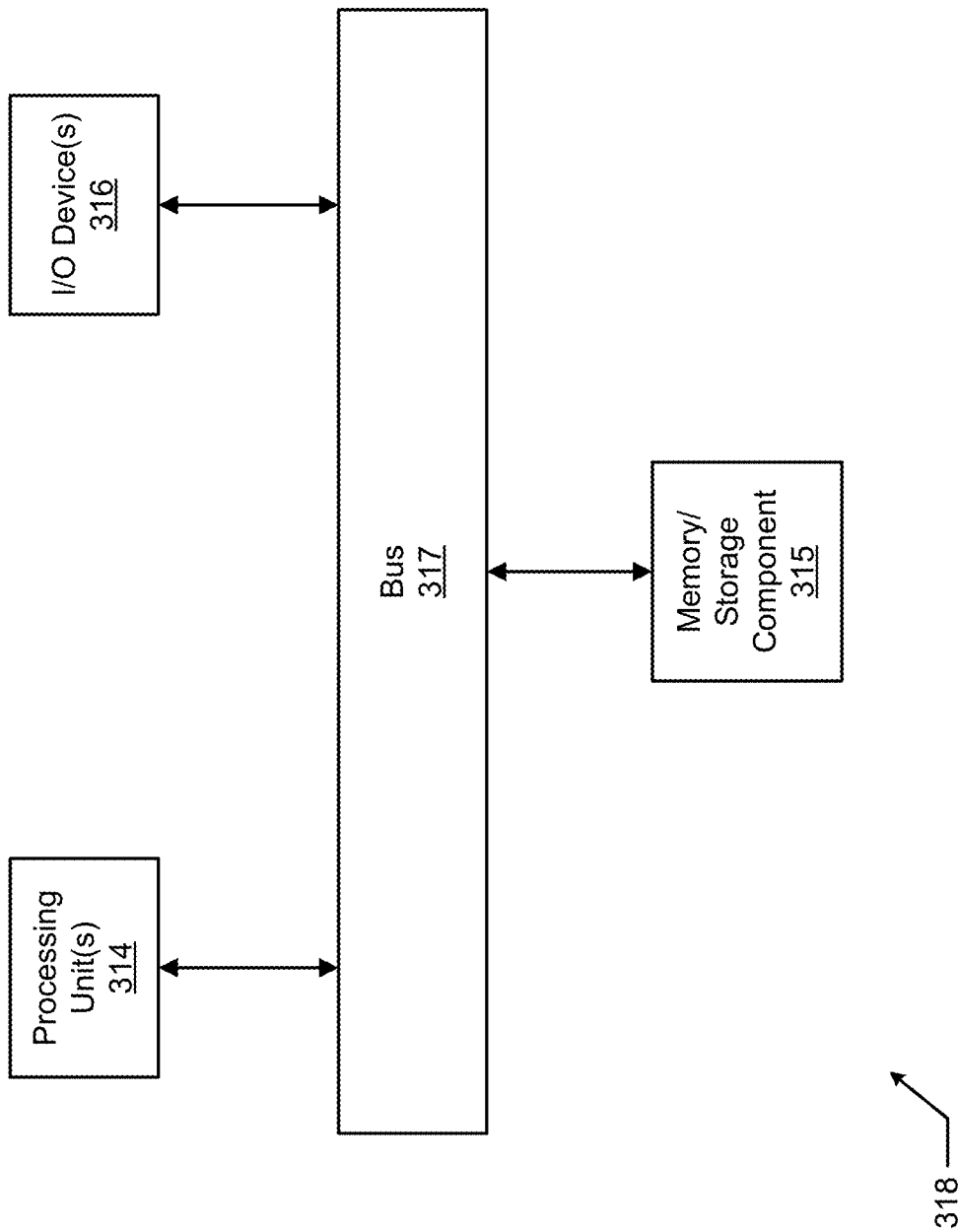

ACTIVE CONFIGURATOR

TECHNICAL FIELD

Embodiments described herein relate generally to configurators, and more particularly to systems, methods, and devices for actively mapping, evaluating, planning, budgeting, ordering, and scheduling installation of new or retrofitted equipment.

BACKGROUND

When installing equipment (e.g., lighting system, security system, fencing, a house), a certain amount of planning must go into the process before the installation work can begin. Part of the planning process involves understanding the existing infrastructure, understanding applicable standards and codes, determining the equipment that can be used, and determining the price of the equipment that is selected for installation. This process can often take weeks because of a number of factors, such as working directly or indirectly with multiple parties, waiting for responses, and adjusting an installation plan based on new information (e.g. before work begins).

SUMMARY

In general, in one aspect, the disclosure relates to an active configurator that includes an interface and a controller coupled to the interface. The controller can receive a number of inputs, via the interface, from a user, where the inputs are associated with a proposed installation in a volume of space, where the inputs include a selection of equipment and virtual placement of the equipment in the volume of space. The controller can also evaluate, using a mapping module, a budgeting module, and an inventory module, the inputs using current information provided by at least one external system communicably coupled to the controller, where the current information includes available inventory evaluated by the inventory module and a cost of the equipment evaluated by the budgeting module, where the current information also relates to evaluating, by the mapping module, conflicts between a location of existing equipment in the volume of space and the virtual placement of the equipment in the volume of space. The controller can further present, using the interface, the inputs in a graphical format, where the graphical format presents a physical representation of the proposed installation in the volume of space.

In another aspect, the disclosure can generally relate to a system for generating a proposed installation in a volume of space. The system can include at least one external system, and an active configurator communicably coupled to the at least one external system. The active configurator can include a hardware processor, and an interface that communicates with a user. The active configurator can also include a control engine communicably coupled to the interface. The control engine can execute instructions on the hardware processor to receive a number of inputs, via the interface, from the user, where the inputs are associated with the proposed installation in the volume of space, where the plurality of inputs include a selection of equipment and virtual placement of the equipment in the volume of space. The control engine can also execute instructions on the hardware processor to evaluate the inputs using current information provided by the at least one external system, where the current information includes available inventory and a cost of the equipment, where the current information also relates to evaluating conflicts between a location of existing equipment in the volume of space and the virtual placement of the equipment in the volume of space. The control engine can further execute instructions on the hardware processor to present, using the interface, the inputs in a graphical format, where the graphical format presents a physical representation of the proposed installation in the volume of space.

In yet another aspect, the disclosure can generally relate to a computer readable medium that includes computer readable program code embodied therein for a method for generating a proposed installation in a volume of space using an active configurator. The method can include receiving a number of inputs, via an interface, from a user, where the inputs are associated with the proposed installation in the volume of space. The method can also include evaluating, using a mapping module, a budgeting module, and an inventory module of a controller, the inputs using current information provided by at least one external system, where the current information includes available inventory evaluated by the inventory module and a cost of the equipment evaluated by the budgeting module, where the current information also relates to evaluating, by the mapping module, conflicts between a location of existing equipment in the volume of space and the virtual placement of the equipment in the volume of space. The method can further include presenting, using the interface, the inputs in a graphical format, where the graphical format presents a physical representation of the proposed installation in the volume of space.

These and other aspects, objects, features, and embodiments will be apparent from the following description and the appended claims.

BRIEF DESCRIPTION OF THE DRAWINGS

The drawings illustrate only example embodiments of active configurators and are therefore not to be considered limiting of its scope, as active configurators may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIG. 3 shows a computing device in accordance with one or more example embodiments.

DETAILED DESCRIPTION OF EXAMPLE EMBODIMENTS

Figure 1:
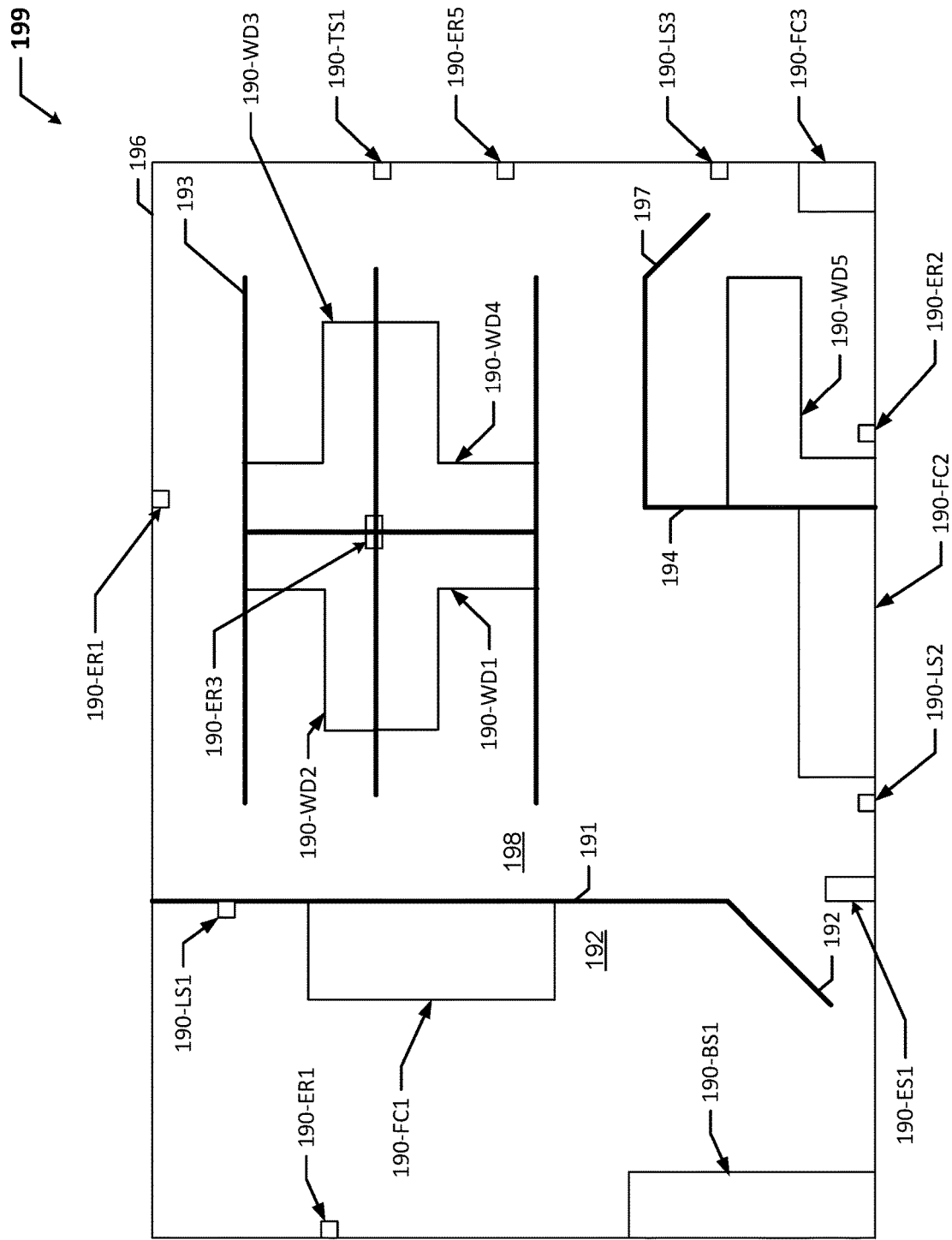
FIG. 1 shows a volume of space subject to an installation.

The example embodiments discussed herein are directed to systems, apparatuses, and methods of active configurators, which can include functionality for configuring, mapping, evaluating, planning, budgeting, ordering, scheduling, and performing any other function associated with installation of new or retrofitted equipment. While example embodiments described herein are directed to use with installing lighting systems, example embodiments can also be used for installing any other systems and/or equipment. Examples of such other systems and/or equipment can include, but are not limited to, fire protection systems, security systems, an out building, a sprinkler system, a wiring system, an inventory system, an assembly line, and furniture. Thus, example embodiments are not limited to use with lighting systems.

As described herein, a user can be any person that interacts with the installation of lighting systems and/or other systems and equipment that can be installed or retrofitted. Examples of a user may include, but are not limited to, a consumer, an electrician, an engineer, a mechanic, a lighting engineer, a lighting technician, a lighting designer, a lighting programmer, an instrumentation and control technician, a consultant, a contractor, an operator, a landscape designer, a sales person, a construction engineer, a landowner, a landlord, a tenant, and a manufacturer's representative. Example embodiments can be used for installations that occur indoors, outdoors, or a combination thereof.

In the foregoing figures showing example embodiments of active configurators, one or more of the components shown may be omitted, repeated, and/or substituted. Accordingly, example embodiments of active configurators should not be considered limited to the specific arrangements of components shown in any of the figures. For example, features shown in one or more figures or described with respect to one embodiment can be applied to another embodiment associated with a different figure or description. Further, any description of a figure or embodiment made herein stating that one or more components are not included in the figure or embodiment does not mean that such one or more components could not be included in the figure or embodiment, and that for the purposes of the claims set forth herein, such one or more components can be included in one or more claims directed to such figure or embodiment.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

In certain example embodiments, the systems (or portions thereof) that are subject to installation described herein must comply with one or more of a number of standards, codes, regulations, and/or other requirements established and maintained by one or more entities. Examples of such entities include, but are not limited to, Underwriters' Laboratories (UL), the National Electric Code (NEC), the California Energy Commission (CEC), the Institute of Electrical and Electronics Engineers (IEEE), the Federal Communication Commission (FCC), and the National Fire Protection Association (NFPA). For example, light fixtures installed in a volume of space are subject to compliance with one or more standards set forth in the NEC.

Example embodiments of active configurators will be described more fully hereinafter with reference to the accompanying drawings, in which example embodiments of active configurators are shown. Active configurators may, however, be embodied in many different forms and should not be construed as limited to the example embodiments set forth herein. Rather, these example embodiments are provided so that this disclosure will be thorough and complete, and will fully convey the scope of active configurators to those of ordinary skill in the art. Like, but not necessarily the same, elements (also sometimes called components) in the various figures are denoted by like reference numerals for consistency.

Terms used herein such as, but not limited to, "top", "bottom", "left", "right", "first", and "second" are used merely to distinguish one component (or part of a component or state of a component) from another. Such terms are not meant to denote a preference or a particular orientation, and are not meant to limit embodiments of active configurators. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a volume of space 199 that is subject to an installation. Specifically, the volume of space 199 of FIG. 1 is part of an office building. There are a number of elements that define and/or are disposed within the volume of space 199. These elements include equipment 190 that can be electrical devices or non-electrical devices. Among the equipment 190 that are non-electrical devices, there are three file cabinets 190-FC (file cabinet 190-FC1, file cabinet 190-FC2, and file cabinet 190-FC3), five work desks 190-WD (work desk 190-WD1, work desk 190-WD2, work desk 190-WD3, work desk 190-WD4, and work desk 190-WD5), and a book shelf 190-BS1.

Among the equipment 190 that are electrical devices, there are five electrical receptacles 190-ER (electrical receptacle 190-ER1, electrical receptacle 190-ER2, electrical receptacle 190-ER3, electrical receptacle 190-ER4, and electrical receptacle 190-ER5), a thermostat 190-TS1, three light switches 190-LS (light switch 190-LS1, light switch 190-LS2, and light switch 190-LS3), and an exit sign 190-ES1.

These elements also include a number of walls (in this case, wall 191, wall 193, wall 194, and wall 196) and two doors (door 192, door 197). Wall 196 defines the outer perimeter of the volume of space 199. The volume of space 199 is divided into a number of areas. For example, wall 191 and door 192 separate a hallway 192 (in which electrical receptacle 190-ER1, light switch 190-LS1, file cabinet 190-FC1, and book shelf 190-BS1 are located) from a work space 198 (in which the remainder of the equipment 190 is located). The exit sign 190-ES1 is located above the door 192 within the work space 198.

Wall 194 and door 197 define an office (in which electrical receptacle 190-ER2, light switch 190-LS3, file cabinet 190-FC3, and work desk 190-WD5 are located) within the work space 198. In addition, a number of cubicle walls 193 are located within the work space 198 outside of the office. As FIG. 1 shows, there are no light fixtures in the volume of space 199. Example embodiments can be used to interactively design, budget, order, and schedule the work needed to install a lighting system in the volume of space 199 in a very short period of time (e.g., hours).

Figure 2:
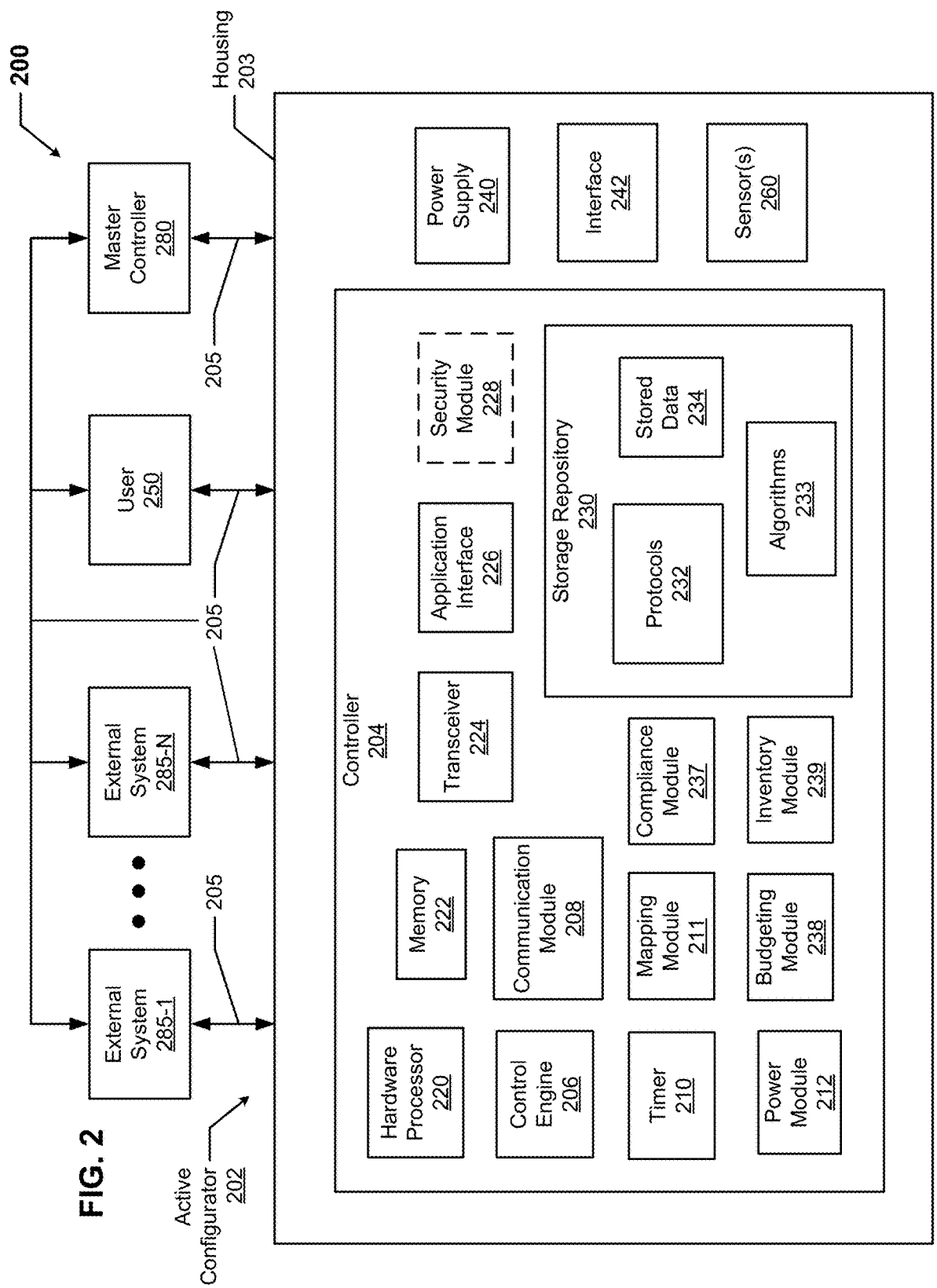
FIG. 2 shows a diagram of a system in accordance with certain example embodiments.

FIG. 2 shows a diagram of a system 200 that includes an active configurator 202 in accordance with certain example embodiments. The system 200 can include a user 250, a master controller 280, and at least one other external system 285 (e.g., external system 285-1, external system 285-N). In addition to the active configurator 202 can include a controller 204, a power supply 240, an interface 242, and one or more sensors 260 (also sometimes called sensor modules 260 or sensor devices 260).

The controller 204 can include one or more of a number of components. Such components, can include, but are not limited to, a control engine 206, a communication module 208, a timer 210, a mapping module 211, a compliance module 237, a budgeting module 238, an inventory module 239, a power module 212, a storage repository 230, a hardware processor 220, a memory 222, a transceiver 224, an application interface 226, and, optionally, a security module 228. The components shown in FIG. 2 are not exhaustive, and in some embodiments, one or more of the components shown in FIG. 2 may not be included in an example active configurator. Any component of the example active configurator 202 can be discrete or combined with one or more other components of the active configurator 202.

A user 250 is defined above. The user 250 can use a user system (not shown), which may include a display (e.g., a GUI). The user 250 interacts with (e.g., sends data to, receives data from) the controller 204 of the active configurator 202 via the application interface 226 (described below). The user 250 can also interact with the master controller 280 and/or any of the external system 285 (e.g., external system 285-1, external system 285-N) in the system 200.

Interaction between the user 250, the active configurator 202 (or components thereof, such as the controller 204 and a sensor 260), an external system 285, and/or the master controller 280 is conducted using communication links 205. Each communication link 205 can include wired (e.g., Class 1 electrical cables, Class 2 electrical cables, electrical connectors, power line carrier, DALI, RS485) and/or wireless (e.g., Wi-Fi, visible light communication, cellular networking, UART, SPI, I2C, visible light communication (VLC), 802.15.4 wireless, ZigBee, 4G cellular wireless, Bluetooth, WirelessHART, ISA100) technology. For example, a communication link 205 can be (or include) one or more electrical conductors that are coupled to the optional housing 203 of the active configurator 202. The communication link 205 can transmit signals (e.g., power signals, communication signals, control signals, data) between the active configurator 202, the external systems 285, the user 250, and/or the master controller 280.

The master controller 280 is a device or component that controls all or a portion of a communication network that includes the controller 204 of the active configurator 202 and the external systems 285 (including components thereof) that are communicably coupled to the controller 204. The master controller 280 can be substantially similar to the controller 204. Alternatively, the master controller 280 can include one or more of a number of features in addition to, or altered from, the features of the controller 204 described below. As described herein, communication with the master controller 280 can include communicating with one or more other components (e.g., another active configurator 202) of the system 200 or another system. In such a case, the master controller 280 can facilitate such communication.

As shown in FIG. 2, the system 200 can include one or more of a number of external systems 285. An external system 285 is a source of information that is external to the active configurator 202. Such information provided by an external system 285 can be used, at least in part, in evaluating, preparing for, and/or executing an installation in a volume of space. Examples of an external system 285 can include, but are not limited to, an inventory management system, a regulatory database, a code authority, a price management system, a workforce scheduling system, a supplier network, a transportation scheduling system, forecasting tools, a bank, and a construction engineering database.

Examples of information that can be provided by an external system 285 can include, but are not limited to, available inventory, available products, available workforce, costs, regulatory requirements, code requirements, the existence, location, and/or layout of existing equipment and systems, dimensions of a volume of space, location of easements and common areas, and a prediction of cost savings or a cost comparison over time. The active configurator 202 can actively request and receive from an appropriate external system 285 various information needed to implement some stage (e.g., planning, scheduling, executing) of installation.

The one or more sensors 260 of the active configurator 202 can be any type of sensing device that measures one or more parameters. Examples of types of sensors 260 can include, but are not limited to, a passive infrared sensor, a photocell, a microphone, a pressure sensor, a proximity sensor, a SONAR sensor, a LIDAR sensor, a seismic sensor, a camera, a global positioning system, and an air flow monitor. A parameter that can be measured by a sensor 260 can include, but is not limited to, motion, hand gestures by a user 250, movements of the head of a user 250, sound, facial features, distance, light, and time.

In some cases, the parameter or parameters measured by a sensor 260 can be used by the active configurator 202 to receive measurements, instructions, and/or requests relative to planning for an installation. For example, a sensor 260 can include a microphone and voice-to-text software so that the sensor 260 can recognize and act on verbal statements (e.g., questions, inputs) made by the user 250. As another example, a sensor 260 can include a camera that detects objects in a volume of space and can measure the size (e.g., dimensions) and precise location of each object in the volume of space.

Each sensor 260 can use one or more of a number of communication protocols. A sensor 260 can be associated with an external system 285 and/or the interface 242 in the system 200. A sensor 260 can be located within the housing 203 of the active configurator 202, disposed on the housing 203 of the active configurator 202, or located outside the housing 203 of the active configurator 202. A sensor 260 can be part of, or separate from, the controller 204. In certain example embodiments, a sensor 260 can include a battery that is used to provide power, at least in part, to some or all of the rest of the sensor 260.

The interface 242 can be a component of the active configurator 202 that actively receives input from and, in some cases, provides output to the user 250. The interface 242 can be physical or virtual. Examples of such an interface 242 can include, but are not limited to, a touch screen, a display, a mouse, a keyboard, a stylus, a printer, and a speaker. In some cases, such as when the interface 242 is virtual, the interface 242 can be integrated with one or more sensors 260 (e.g., a microphone with voice recognition software, a camera with software recognizing specific gestures).

The power supply 240 of the active configurator 202 can provide power to one or more of the sensors 260, the interface 242, and the power module 212 of the controller 204. The power supply 240 can be substantially the same as, or different than, the power module 212 (described below) of the controller 204. The power supply 240 can include one or more of a number of single or multiple discrete components (e.g., transistor, diode, resistor), and/or a microprocessor. The power supply 240 may include a printed circuit board, upon which a microprocessor and/or one or more discrete components are positioned.

The power supply 240 can include one or more components (e.g., a transformer, a diode bridge, an inverter, a converter) that receives power (for example, through an electrical cable) from a source external to the active configurator 202 and generates power of a type (e.g., alternating current, direct current) and level (e.g., 12V, 24V, 120V) that can be used by the sensors 260, the interface 242, and/or the power module 212. In addition, or in the alternative, the power supply 240 can receive power from the power module 212 of the controller 204. In addition, or in the alternative, the power supply 240 can be a source of power in itself. For example, the power supply 240 can be a battery, a localized photovoltaic power system, or some other source of independent power.

The user 250, the master controller 280, and/or the external systems 285 can interact with the controller 204 of the active configurator 202 using the application interface 226 in accordance with one or more example embodiments. Specifically, the application interface 226 of the controller 204 receives data (e.g., information, communications, instructions, updates to firmware) from and sends data (e.g., information, communications, instructions) to the user 250, the master controller 280, and/or the external systems 285. The user 250, the master controller 280, and/or the external systems 285 can include an interface to receive data from and send data to the controller 204 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 204, the user 250, the master controller 280, and/or the external systems 285 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 204. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user software, active configurator software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 200. The active configurator 202 can include an optional housing 203. In some cases, the housing can be designed to comply with any applicable standards so that the active configurator 202 can be located in a particular environment (e.g., a humid environment, a cold environment).

The housing 203 of the active configurator 202 can be used to house one or more components of the active configurator 202, including one or more components of the controller 204. For example, as shown in FIG. 2, the controller 204 (which in this case includes the control engine 206, the communication module 208, the timer 210, the mapping module 211, the compliance module 237, the budgeting module 238, the inventory module 239, the power module 212, the storage repository 230, the hardware processor 220, the memory 222, the transceiver 224, the application interface 226, and the optional security module 228), the power supply 240, the sensors 260, and the interface 242 can be disposed in the formed by the housing 203 or integrated with the housing 203. In alternative embodiments, any one or more of these and/or other components of the active configurator 202 can be disposed on the housing 203 and/or remotely from the housing 203.

The storage repository 230 can be a persistent storage device (or set of devices) that stores software and data used to assist the controller 204 in communicating with the user 250, the master controller 280, and the external systems 285 within the system 200. In one or more example embodiments, the storage repository 230 stores one or more protocols 232, algorithms 233, and stored data 234. The protocols 232 are any logic steps and/or methods followed by the control engine 206 based on certain conditions at a point in time. The protocols 232 can include any of a number of communication protocols that are used to send and/or receive data between the controller 204 and the user 250, the master controller 280, and the external systems 285. A protocol 232 can also include any of a number of processes for requesting and receiving information from one or more external systems 285 in the system 200.

A protocol 232 can also be a method by which to implement one or more stages (e.g., planning, scheduling, purchasing, implementing) performed by the active configurator 202 in association with installation of equipment and/or a system. One or more of the protocols 232 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 232 can provide a layer of security to the data transferred within the system 200.

The algorithms 233 can be any formulas, mathematical models, and/or other similar operational tools that the control engine 206 of the controller 204 uses. An example of an algorithm 233 is identifying a permitted layout of selected equipment in a volume of space in light of existing equipment and systems, code and regulatory requirements, and cost. An algorithm 233 can be fixed or modified (e.g., by a user 250, by the control engine 206) over time. Modification of an algorithm 233 can be based on one or more of a number of factors, including but not limited to a new external system 285 (or information provided thereby), an instruction from a user 250, and correction based on actual data.

Stored data 234 can be any data (e.g., processing speed) associated with the active configurator 202 (including other active configurators 202 and/or any components thereof), any data associated with an external system 285, any measurements taken by the sensors 260, outputs of the mapping module 211, threshold values, results of previously run or calculated algorithms 233, and/or any other suitable data. Such data can be any type of data, including but not limited to historical data from an external system 285, results of previously-run algorithms 233, prior calculations, prior results from the budgeting module 238, and measurements taken by one or more sensors 260. The stored data 234 can be associated with some measurement of time derived, for example, from the timer 210.

Examples of a storage repository 230 can include, but are not limited to, a database (or a number of databases), a file system, a hard drive, flash memory, some other form of solid state data storage, or any suitable combination thereof. The storage repository 230 can be located on multiple physical machines, each storing all or a portion of the protocols 232, the algorithms 233, and/or the stored data 234 according to some example embodiments. Each storage unit or device can be physically located in the same or in a different geographic location.

The storage repository 230 can be operatively connected to the control engine 206. In one or more example embodiments, the control engine 206 includes functionality to communicate with the user 250, the master controller 280, and the external systems 285 in the system 200. More specifically, the control engine 206 sends information to and/or receives information from the storage repository 230 in order to communicate with the user 250, the master controller 280, and the external systems 285. As discussed below, the storage repository 230 can also be operatively connected to the communication module 208 in certain example embodiments.

In certain example embodiments, the control engine 206 of the controller 204 controls the operation of one or more components (e.g., the communication module 208, the timer 210, the transceiver 224, the mapping module 211, the compliance module 237, the budgeting module 238, the inventory module 239) of the controller 204. For example, the control engine 206 can activate the communication module 208 when the communication module 208 is in "sleep" mode and when the communication module 208 is needed to send data received from another component (e.g., an external system 285, the user 250) in the system 200.

As another example, the control engine 206 can acquire the current time using the timer 210. The timer 210 can enable the controller 204 to control the active configurator 202 even when the controller 204 has no communication with the master controller 280. As yet another example, the control engine 206 can direct the mapping module 211 to run a scenario and subsequently send the results to the master controller 280. In some cases, the control engine 206 of the controller 204 can generate and send a signal to the power supply 240, which causes the interface 242 and/or one or more of the sensors 260 to operate.

The control engine 206 can be configured to perform a number of functions that help the active configurator 202 (or components thereof) perform one or more functions (e.g., planning, purchasing, budgeting, scheduling, implementing) of an installation process. As discussed above, the control engine 206 can execute any of the protocols 232 and/or the algorithms 233, using stored data 234 stored in the storage repository 230 and/or information provided by one or more external systems 285, to perform one or more functions of an installation process.

The control engine 206 can provide control, communication, and/or other similar signals to the user 250, the master controller 280, and the external systems 285. Similarly, the control engine 206 can receive control, communication, and/or other similar signals from the user 250, the master controller 280, and the external systems 285. The control engine 206 can control each sensor 260 automatically (for example, based on one or more protocols 232 or algorithms 233 stored in the control engine 206) and/or based on control, communication, and/or other similar signals received from another component of the system 200 through a communication link 205. The control engine 206 may include a printed circuit board, upon which the hardware processor 220 and/or one or more discrete components of the controller 204 are positioned.

As stated above, in certain embodiments, the control engine 206 of the controller 204 can communicate with one or more external systems 285 in furtherance of installing a system and/or equipment within a volume of space. For example, the control engine 206 can interact with an inventory management system (an external system 285) to determine what equipment is currently in inventory and at what location. As another example, the control engine 206 can interact with a workforce scheduling system (another external system 285) by scheduling a construction crew (e.g., electricians, mechanics, instrument and control technicians) to install or replace a piece of equipment in a volume of space. In this way, the controller 204 is capable of performing a number of functions beyond what could reasonably be considered a routine task.

In certain example embodiments, the control engine 206 can include an interface that enables the control engine 206 to communicate with one or more components (e.g., power supply 240) of the active configurator 202. For example, if the power supply 240 of the active configurator 202 operates under IEC Standard 62386, then the power supply 240 can have a serial communication interface that will transfer data (e.g., stored data 234) measured by the sensors 260. In such a case, the control engine 206 can also include a serial interface to enable communication with the power supply 240 within the active configurator 202. Such an interface can operate in conjunction with, or independently of, the protocols 232 used to communicate between the controller 204 and the user 250, the master controller 280, and the external systems 285.

The control engine 206 (or other components of the controller 204) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 208 of the controller 204 determines and implements the communication protocol (e.g., from the protocols 232 of the storage repository 230) that is used when the control engine 206 communicates with (e.g., sends signals to, receives signals from) the user 250, the master controller 280, and/or the external systems 285. In some cases, the communication module 208 accesses the stored data 234 to determine which communication protocol is used to communicate with an external system 285 associated with the stored data 234. In addition, the communication module 208 can interpret the communication protocol of a communication received by the controller 204 so that the control engine 206 can interpret the communication.

The communication module 208 can send and receive data between the master controller 280, the sensors 260, the external systems 285, the user 250, and the controller 204. The communication module 208 can send and/or receive data in a given format that follows a particular protocol 232. The control engine 206 can interpret the data packet received from the communication module 208 using the protocol 232 information stored in the storage repository 230. The control engine 206 can also facilitate the data transfer between one or more sensors 260 and the master controller 280, the external systems 285, and/or a user 250 by converting the data into a format understood by the communication module 208.

The communication module 208 can send data (e.g., protocols 232, algorithms 233, stored data 234, operational information, model results) directly to and/or retrieve data directly from the storage repository 230. Alternatively, the control engine 206 can facilitate the transfer of data between the communication module 208 and the storage repository 230. The communication module 208 can also provide encryption to data that is sent by the controller 204 and decryption to data that is received by the controller 204. The communication module 208 can also provide one or more of a number of other services with respect to data sent from and received by the controller 204. Such services can include, but are not limited to, data packet routing information and procedures to follow in the event of data interruption.

The timer 210 of the controller 204 can track clock time, intervals of time, an amount of time, and/or any other measure of time. The timer 210 can also count the number of occurrences of an event, whether with or without respect to time. Alternatively, the control engine 206 can perform the counting function. The timer 210 is able to track multiple time measurements concurrently. The timer 210 can track time periods based on an instruction received from the control engine 206, based on an instruction received from the user 250, based on an instruction programmed in the software for the controller 204, based on some other condition or from some other component, or from any combination thereof.

The timer 210 can be configured to track time when there is no power delivered to the controller 204 (e.g., the power module 212 malfunctions) using, for example, a super capacitor or a battery backup. In such a case, when there is a resumption of power delivery to the controller 204, the timer 210 can communicate any aspect of time to the controller 204. In such a case, the timer 210 can include one or more of a number of components (e.g., a super capacitor, an integrated circuit) to perform these functions.

The mapping module 211 of the controller 204 is capable of mapping existing and/or potential systems (including components (e.g., equipment) thereof) in a volume of space. For example, the various elements shown in the volume of space 199 of FIG. 1 can be an output of the mapping module 211. The mapping module 211 can work at the direction of the control engine 206 to function. The mapping module 211 can receive information about the existing and potential systems from one or more of any number of sources. For example, the mapping module 211 can receive the dimensions of a room from an architectural engineering database (a type of external system 285) and/or from measurements taken by one or more sensors 260. As another example, the mapping module 211 can receive the location of conduit, outlets, switches, and wiring for a room from an electrical engineering database (another type of external system 285).

As yet another example, the mapping module 211 can receive the proposed layout and equipment for a lighting system from the control engine 206 via a user 250 through the interface 242 or some other form of communication. As still another example, some or all of the output of one or more other modules (e.g., the inventory module 239) can be available to the mapping module 211. If a conflict exists between a proposed layout of equipment and existing equipment, the mapping module 211 can notify the control engine 206 of the conflict. In some cases, the mapping module 211 can suggest one or more alternatives for resolving such a conflict. The mapping module 211 can initiate contact, through the control engine 206, with one or more external systems 285, the user 250, and/or the master controller 280 to retrieve initial information, or if additional information is needed to generate an output of the mapping module 211.

The inventory module 239 can determine any information associated with the various equipment selected for a proposed installation. Such information can include, but is not limited to, whether the equipment is available, where such equipment is held in inventory, any applicable vendor information, and the expected delivery time. The inventory module 239 can work at the direction of the control engine 206 to function. The inventory module 239 can receive information about the proposed installation from one or more of any number of sources.

For example, some or all of the output of one or more other modules (e.g., the mapping module 211) can be available to the inventory module 239. As another example, the inventory module 239 can receive the inventory and/or vendor information from an inventory management system (a type of external system 285). As yet another example, the inventory module 239 can receive the delivery information from a shipping vendor system (another type of external system 285). If there are multiple options for a certain piece of equipment, the inventory module 239 can present these multiple options along with any associated information (e.g., quality, price, estimated delivery date).

The proposed equipment that is searched by the inventory module 239 can be received from the control engine 206 via the user 250 through the interface 242 or some other form of communication. The inventory module 239 can initiate contact, through the control engine 206, with one or more external systems 285, the user 250, and/or the master controller 280 to retrieve initial information, or if additional information is needed to generate an output of the inventory module 239.

The compliance module 237 can determine whether a proposed installation would be in compliance with any applicable codes or regulations. The compliance module 237 can work at the direction of the control engine 206 to function. The compliance module 237 can receive information about the potential systems from one or more of any number of sources. For example, some or all of the output of one or more other modules (e.g., the mapping module 211) can be available to the compliance module 237. As another example, the compliance module 237 can obtain any applicable codes and/or regulations for a proposed installation from government regulatory database and/or an industry standards database (types of external systems 285).

If there is a violation of a code or regulation for a proposed installation, the compliance module 237 can identify the violation and, in some cases, propose solutions (either specific or generalized) for overcoming the violation. The proposed installation that is searched by the compliance module 237 can be received from the control engine 206 via the user 250 through the interface 242 or some other form of communication. The compliance module 237 can initiate contact, through the control engine 206, with one or more external systems 285, the user 250, and/or the master controller 280 to retrieve initial information, or if additional information is needed to generate an output of the compliance module 237.

The budgeting module 238 can determine a cost estimate (e.g., equipment cost, installation cost, projected maintenance costs) of a proposed installation. The budgeting module 238 can also project costs associated with operating a proposed installation. The budgeting module 238 can also compare various costs of one or more proposed installations and, in some cases, with an existing system if the proposed installation would replace the existing system.

The budgeting module 238 can work at the direction of the control engine 206 to function. The budgeting module 238 can receive information about a proposed installation from one or more of any number of sources. For example, some or all of the output of one or more other modules (e.g., the mapping module 211) can be available to the budgeting module 238. As another example, the budgeting module 238 can obtain any pricing information for a proposed installation from a vendor sales database (a type of external system 285). As yet another example, the budgeting module 238 can obtain any product performance information for a proposed installation from a product performance database or a vendor system (other types of external systems 285).

If there is an issue with a budget (e.g., expected costs of an installation exceed a budgeted amount) for a proposed installation, the budgeting module 238 can identify the issue and, in some cases, propose solutions (either specific or generalized) for overcoming the violation (e.g., suggest alternative equipment). The proposed installation that is researched by the budgeting module 238 can be received from the control engine 206 via the user 250 through the interface 242 or some other form of communication. The budgeting module 238 can initiate contact, through the control engine 206, with one or more external systems 285, the user 250, and/or the master controller 280 to retrieve initial information, or if additional information is needed to generate an output of the budgeting module 238.

In some cases, one or more additional modules can be included in a controller 204 of an example active configurator 202. Alternatively, the control engine 206 can perform additional functions in lieu of adding a module. For example, if a lighting system is being proposed for installation using the active configurator 202, a light analysis module can be added to the controller 204 to analyze the light output of the proposed installation, and also to suggest alternative configurations and/or equipment of the proposed lighting system if better lighting results can be achieved. Alternatively, rather than adding a light analysis module in this example, the capabilities of the control engine 206 can be expanded to perform these functions.

The power module 212 of the controller 204 provides power to one or more other components (e.g., timer 210, control engine 206) of the controller 204. In addition, in certain example embodiments, the power module 212 can provide power to the power supply 240 of the active configurator 202. The power module 212 can include one or more of a number of single or multiple discrete components (e.g., transistor, diode, resistor), and/or a microprocessor. The power module 212 may include a printed circuit board, upon which the microprocessor and/or one or more discrete components are positioned. In some cases, the power module 212 can include one or more components that allow the power module 212 to measure one or more elements of power (e.g., voltage, current) that is delivered to and/or sent from the power module 212.

The power module 212 can receive power (for example, through an electrical cable) from a source (e.g., the power supply 240) external to the controller 204 and generates power of a type (e.g., alternating current, direct current) and level (e.g., 12V, 24V, 120V) that can be used by the other components of the controller 204. The power module 212 can use a closed control loop to maintain a preconfigured voltage or current with a tight tolerance at the output. The power module 212 can also protect the rest of the electronics (e.g., hardware processor 220, transceiver 224) in the active configurator 202 from surges generated in the line.

In addition, or in the alternative, the power module 212 can be a source of power in itself to provide signals to the other components of the controller 204. For example, the power module 212 can be a battery. As another example, the power module 212 can be a localized photovoltaic power system. The power module 212 can also have sufficient isolation in the associated components of the power module 212 (e.g., transformers, opto-couplers, current and voltage limiting devices) so that the power module 212 is certified to provide power to an intrinsically safe circuit.

In certain example embodiments, the power module 212 of the controller 204 can also provide power and/or control signals, directly or indirectly, to one or more of the sensors 260. In such a case, the control engine 206 can direct the power generated by the power module 212 to the sensors 260 and/or the interface 242 of the active configurator 202. In this way, power can be conserved by sending power to the sensors 260 and/or the interface 242 of the active configurator 202 when those devices need power, as determined by the control engine 206.

The hardware processor 220 of the controller 204 executes software, algorithms, and firmware in accordance with one or more example embodiments. Specifically, the hardware processor 220 can execute software on the control engine 206 or any other portion of the controller 204, as well as software used by the user 250, the master controller 280, the external systems 285, and/or one or more of the sensors 260. The hardware processor 220 can be an integrated circuit, a central processing unit, a multi-core processing chip, SoC, a multi-chip module including multiple multi-core processing chips, or other hardware processor in one or more example embodiments. The hardware processor 220 is known by other names, including but not limited to a computer processor, a microprocessor, and a multi-core processor.

In one or more example embodiments, the hardware processor 220 executes software instructions stored in memory 222. The memory 222 includes one or more cache memories, main memory, and/or any other suitable type of memory. The memory 222 can include volatile and/or non-volatile memory. The memory 222 is discretely located within the controller 204 relative to the hardware processor 220 according to some example embodiments. In certain configurations, the memory 222 can be integrated with the hardware processor 220.

In certain example embodiments, the controller 204 does not include a hardware processor 220. In such a case, the controller 204 can include, as an example, one or more field programmable gate arrays (FPGA), insulated-gate bipolar transistors (IGBTs), and integrated circuits (ICs). Using FPGAs, IGBTs, ICs, and/or other similar devices known in the art allows the controller 204 (or portions thereof) to be programmable and function according to certain logic rules and thresholds without the use of a hardware processor. Alternatively, FPGAs, IGBTs, ICs, and/or similar devices can be used in conjunction with one or more hardware processors 220.

The transceiver 224 of the controller 204 can send and/or receive control and/or communication signals. Specifically, the transceiver 224 can be used to transfer data between the controller 204 and the user 250, the master controller 280, the external systems 285, and/or the sensors 260 (e.g., if remote from the active configurator 202). The transceiver 224 can use wired and/or wireless technology. The transceiver 224 can be configured in such a way that the control and/or communication signals sent and/or received by the transceiver 224 can be received and/or sent by another transceiver that is part of the user 250, the master controller 280, one or more of the external systems 285, and/or the sensors 260. The transceiver 224 can use any of a number of signal types, including but not limited to radio frequency signals.

When the transceiver 224 uses wireless technology, any type of wireless technology can be used by the transceiver 224 in sending and receiving signals. Such wireless technology can include, but is not limited to, Wi-Fi, visible light communication (VLC), cellular networking, UART, SPI, I2C, 802.15.4 wireless, ZigBee, 4G cellular wireless, and Bluetooth. The transceiver 224 can use one or more of any number of suitable communication protocols (e.g., ISA100, HART) when sending and/or receiving signals. Such communication protocols can be stored in the protocols 232 of the storage repository 230. Further, any transceiver information for the user 250, the master controller 280, the external systems 285, and/or the sensors 260 can be part of the stored data 234 (or similar areas) of the storage repository 230.

Optionally, in one or more example embodiments, the security module 228 secures interactions between the controller 204, the user 250, the master controller 280, the external systems 285, and/or the sensors 260. More specifically, the security module 228 authenticates communication from software based on security keys verifying the identity of the source of the communication. For example, user software may be associated with a security key enabling the software of the user 250 to interact with the controller 204 and/or the external systems 285. Further, the security module 228 can restrict receipt of information, requests for information, and/or access to information in some example embodiments.

As stated above, the active configurator 202 can be used in any of a number of environments. In such a case, the housing 203 of the active configurator 202 can be configured to comply with applicable standards for any of a number of environments. For example, the active configurator 202 can be rated as a Division 1 or a Division 2 enclosure under NEC standards. Similarly, any of the sensors 260, the interface 242, and/or other devices or components communicably coupled to the active configurator 202 can be configured to comply with applicable standards for any of a number of environments. For example, a sensor 260 can be rated as a Division 1 or a Division 2 enclosure under NEC standards.

FIG. 3 illustrates one embodiment of a computing device 318 that implements one or more of the various techniques described herein, and which is representative, in whole or in part, of the elements described herein pursuant to certain exemplary embodiments. Computing device 318 is one example of a computing device and is not intended to suggest any limitation as to scope of use or functionality of the computing device and/or its possible architectures. Neither should computing device 318 be interpreted as having any dependency or requirement relating to any one or combination of components illustrated in the example computing device 318.

Computing device 318 includes one or more processors or processing units 314, one or more memory/storage components 315, one or more input/output (I/O) devices 316, and a bus 317 that allows the various components and devices to communicate with one another. Bus 317 represents one or more of any of several types of bus structures, including a memory bus or memory controller, a peripheral bus, an accelerated graphics port, and a processor or local bus using any of a variety of bus architectures. Bus 317 includes wired and/or wireless buses.

Memory/storage component 315 represents one or more computer storage media. Memory/storage component 315 includes volatile media (such as random access memory (RAM)) and/or nonvolatile media (such as read only memory (ROM), flash memory, optical disks, magnetic disks, and so forth). Memory/storage component 315 includes fixed media (e.g., RAM, ROM, a fixed hard drive, etc.) as well as removable media (e.g., a Flash memory drive, a removable hard drive, an optical disk, and so forth).

One or more I/O devices 316 allow a customer, utility, or other user to enter commands and information to computing device 318, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 318 is connected to a network (not shown) (e.g., a local area network (LAN), a wide area network (WAN) such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 318 includes at least the minimal processing, input, and/or output means necessary to practice one or more embodiments.

Further, those skilled in the art will appreciate that one or more elements of the aforementioned computer device 318 is located at a remote location and connected to the other elements over a network in certain exemplary embodiments. Further, one or more embodiments is implemented on a distributed system having one or more nodes, where each portion of the implementation (e.g., control engine 206) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

FIGS. 4A-4J show an interface 442 of an active configurator used to create a proposed installation in accordance with certain example embodiments. Specifically, FIGS. 4A-4J show the interface 442 over time as a user (e.g., user 250) creates a proposed installation. In this case, the proposed installation is for a lighting system in a volume of space, and FIGS. 4A-4J show how the proposed installation is built using the interface 442. All aspects of the interface 442 can be controlled by the controller (e.g., controller 204) of the active configurator (e.g., active configurator 202).

Referring to FIGS. 1-4J, FIG. 4A shows how the interface 442 (substantially similar to the interface 242 described above) can appear and function in certain example embodiments. In this case, the interface 442 is a display (e.g., a touchscreen, a passive display) that displays a number of sections. In this case, the interface 442 includes a mapping area 455, a segment list 456 disposed on the left side of the mapping area 455, a component list 457 disposed on the left side of the mapping area 455, and selection menus 470 disposed along the top of the mapping area 455.

The selection menu 470 can have any of a number of selection categories available. For example, in this case, the selection menus 470 includes a viewing menu 471 (which drives a pattern menu 472, a junction menu 473, and a fixture menu 474), a zoom menu 475, and a location menu 476. The interface 442 can also include a summary window 478 to give an overview of the entire mapping area 455. With the "pattern" option selected in the viewing menu 471, the pattern menu 472, the junction menu 473, and the fixture menu 474 are all active.

Figure 4A:
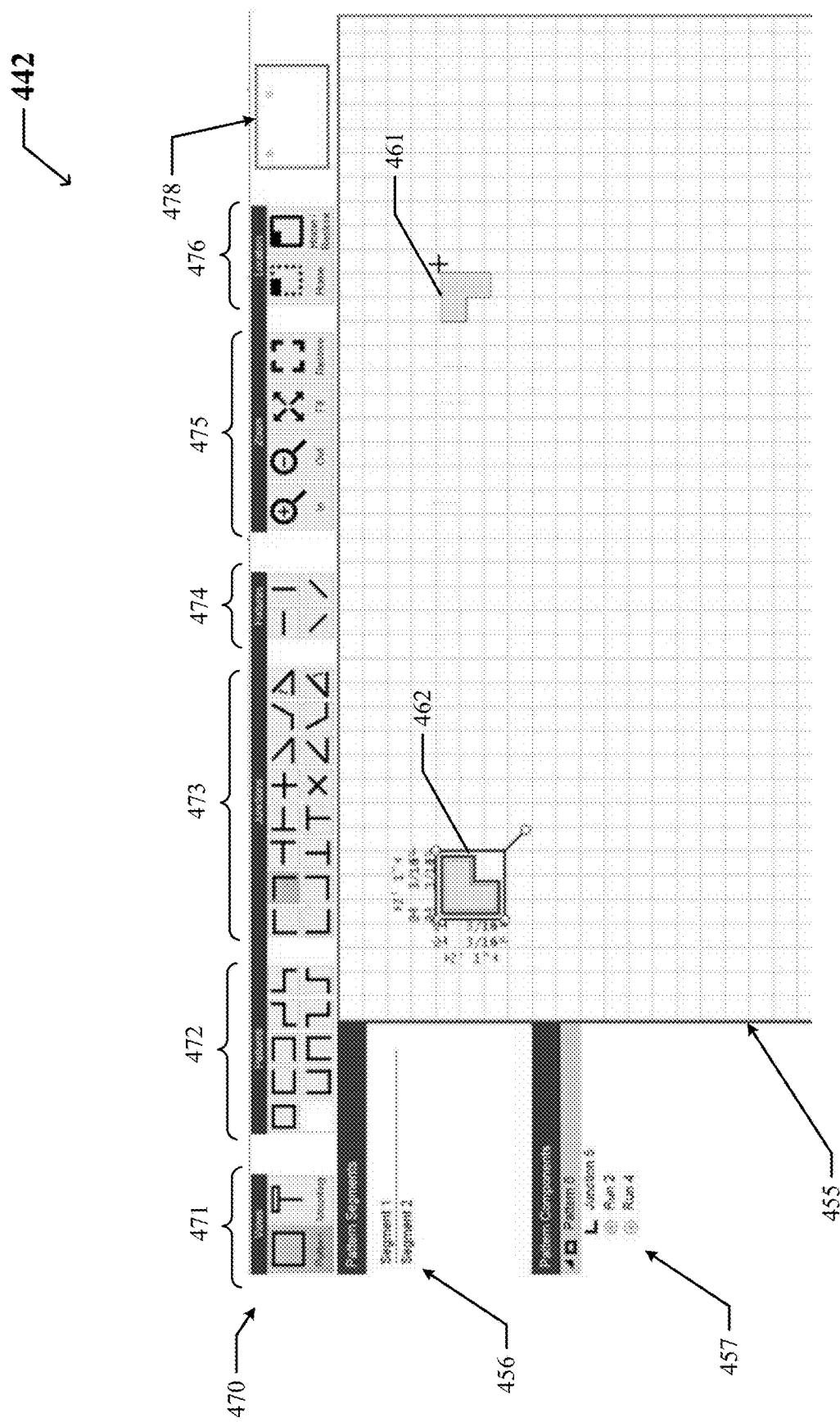
FIGS. 4A-4J show an interface used to create a proposed installation in accordance with certain example embodiments.

The mapping area 455 takes up the majority of the space on the interface 442. The mapping area 455 shows the various selections by a user in creating a proposed installation. In FIG. 4A, the mapping area 455 includes corner junction 461 and corner junction 462. These selections made by the user with respect to the items in the selection menu 470 determine what elements appear in the mapping area 455. The mapping area 455 can include dimensions and/or other relevant information with respect to the corner junction 462 (or any other component of the proposed installation that is presented on the mapping area 455). The segment list 456 and the component list 457 are populated based on the items (in this case, corner junction 461 and corner junction 462) presented in the mapping area 455.

Figure 4B:
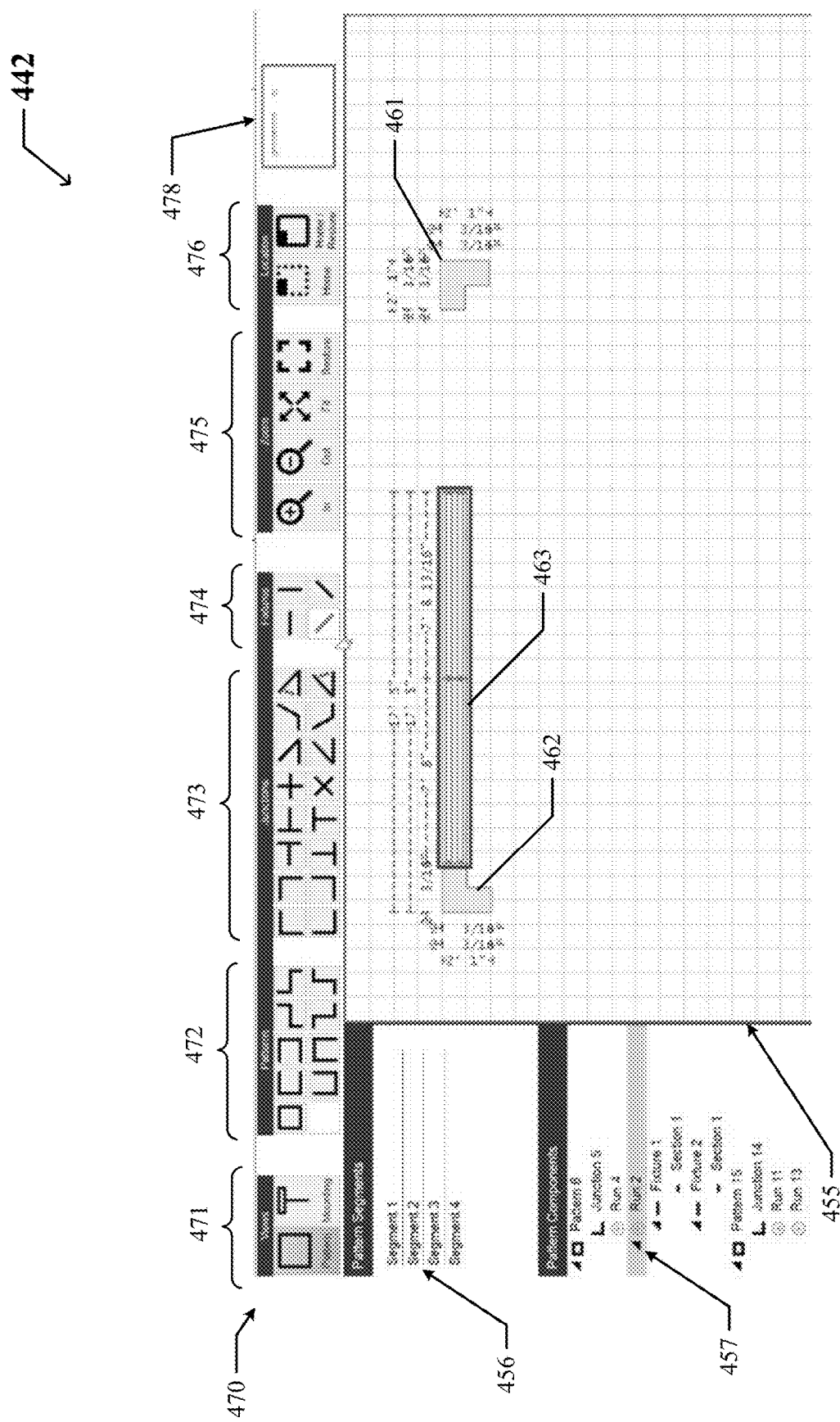

In FIG. 4B, the user has added a linear fixture 463 to the mapping area 455, where the linear fixture 463 is connected to corner junction 462. The segment list 456 and the component list 457 are extended based on the addition of the linear fixture 463 to the mapping area 455. The linear fixture 463 is selected by a user from among the fixture menu 474 in the selection menus 470. As the length of the linear fixture 463 is extended by the user on the mapping area 455, one light fixture becomes two light fixtures coupled end-to-end. The controller (e.g., controller 204) can perform this function automatically when the length of the linear fixture 463 exceeds the maximum available width of the type of light fixture selected. The dimensions of each light fixture are shown on the mapping area 455. The summary window 478 is updated in real time to show these additions to the mapping area 455.

Figure 4C:
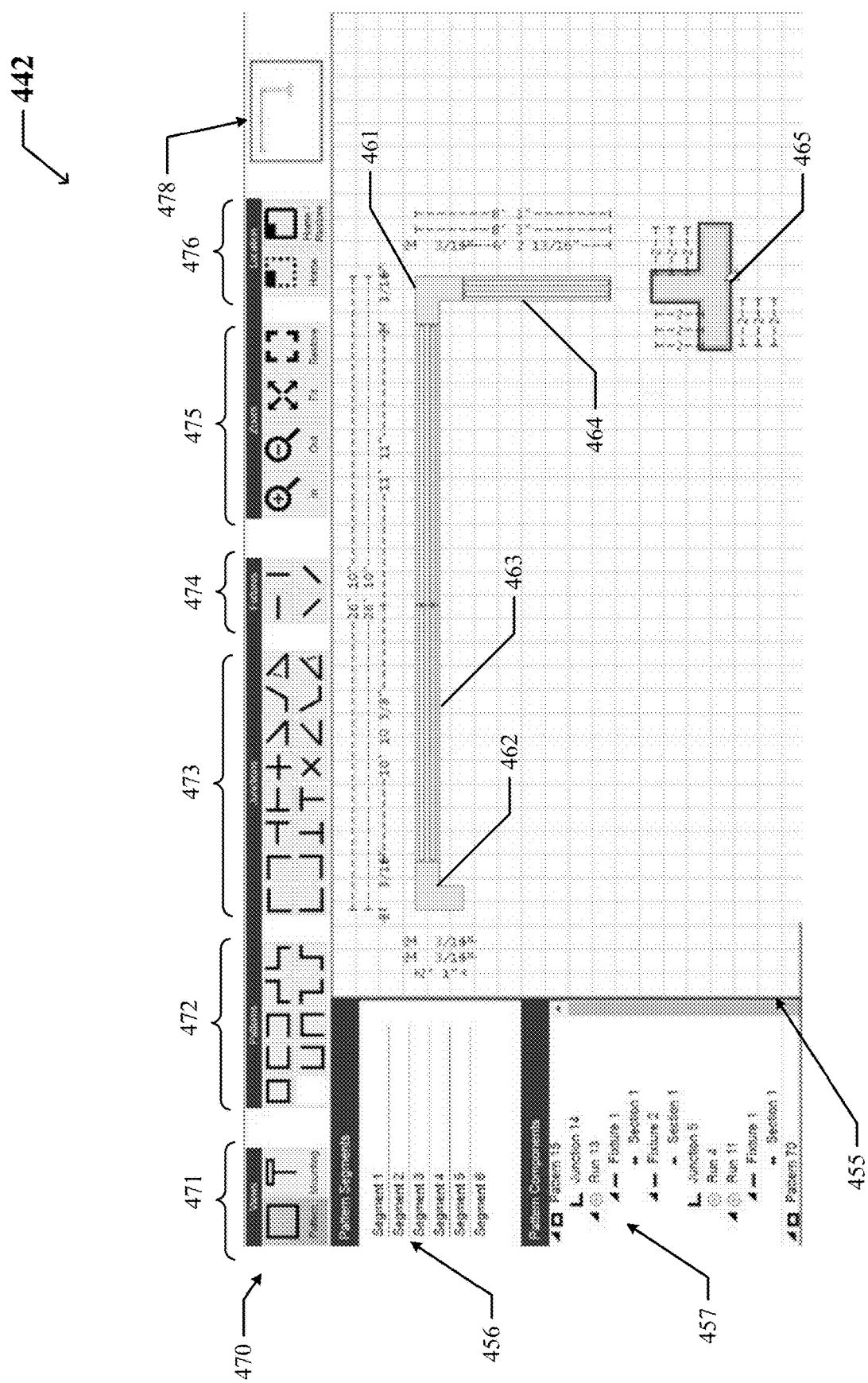

In FIG. 4C, the linear fixture 463 is further extended to couple to corner junction 461. Further, a T junction 465 and another linear fixture 464 are added to the mapping area 455. In this case, linear fixture 464 is coupled to the other end of the corner junction 461 and is extended toward the T junction 465. Again, the segment list 456 and the component list 457 are extended based on the addition of the T junction 465 and the linear fixture 464 to the mapping area 455. The T junction 465 is selected by a user from among the junction menu 473 in the selection menus 470, and the linear fixture 464 is selected by a user from among the fixture menu 474 in the selection menus 470. The summary window 478 is updated in real time to show these additions to the mapping area 455.

Figure 4D:
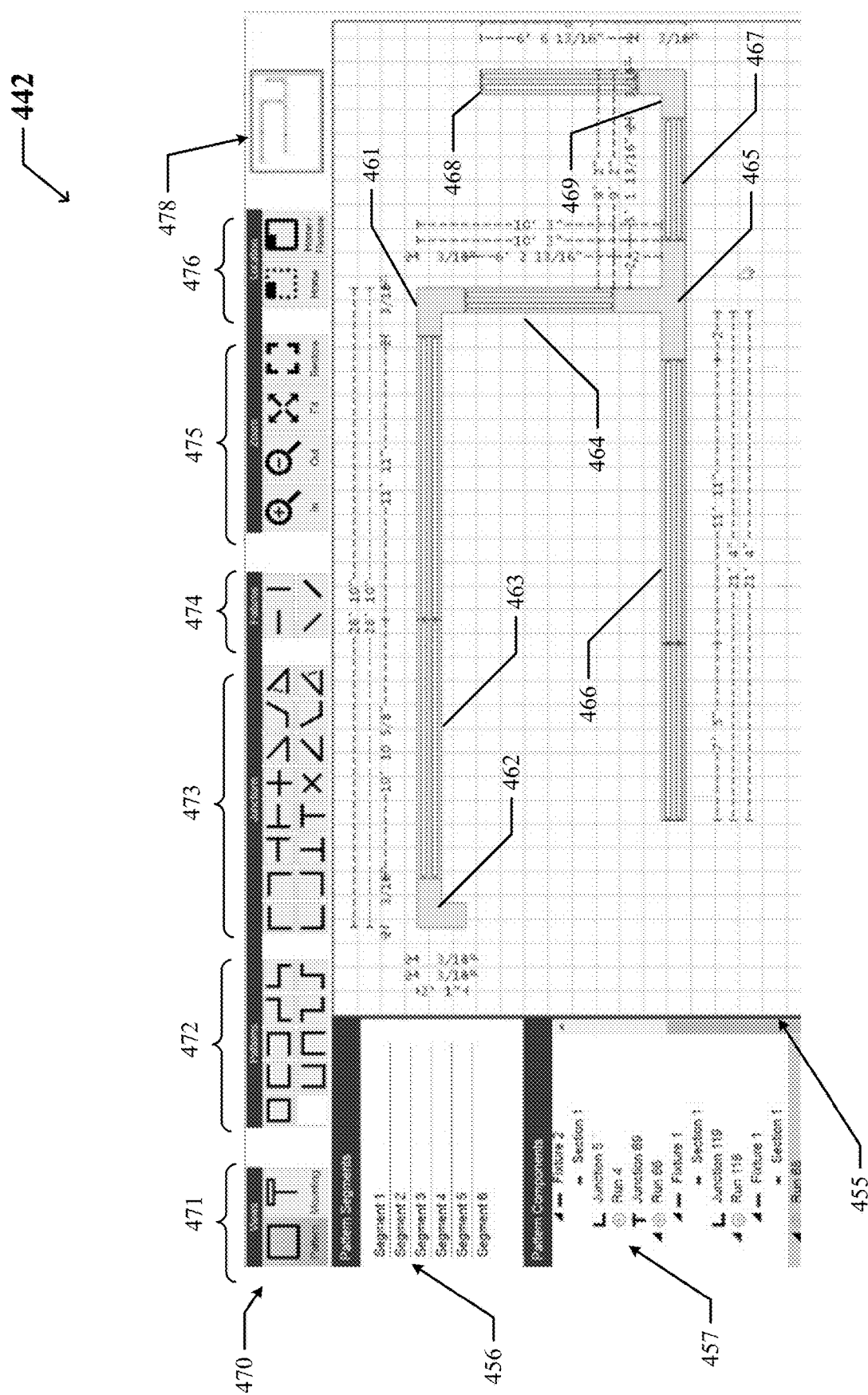

In FIG. 4D, the linear fixture 464 is further extended to couple to T junction 465. Further, a corner junction 469 and three linear fixtures (linear fixture 466, linear fixture 467, and linear fixture 468) are added to the mapping area 455. Linear fixture 467 is coupled to T junction 465 and corner junction 469, linear fixture 468 extends from corner junction 469, and linear fixture 466 extends from T junction 465. Again, the segment list 456 and the component list 457 are extended based on the addition of the corner junction 469, linear fixture 466, linear fixture 467, and linear fixture 468 to the mapping area 455. The corner junction 469 is selected by a user from among the junction menu 473 in the selection menus 470, and the linear fixtures are selected by a user from among the fixture menu 474 in the selection menus 470. The summary window 478 is updated in real time to show these additions to the mapping area 455.

Figure 4E:
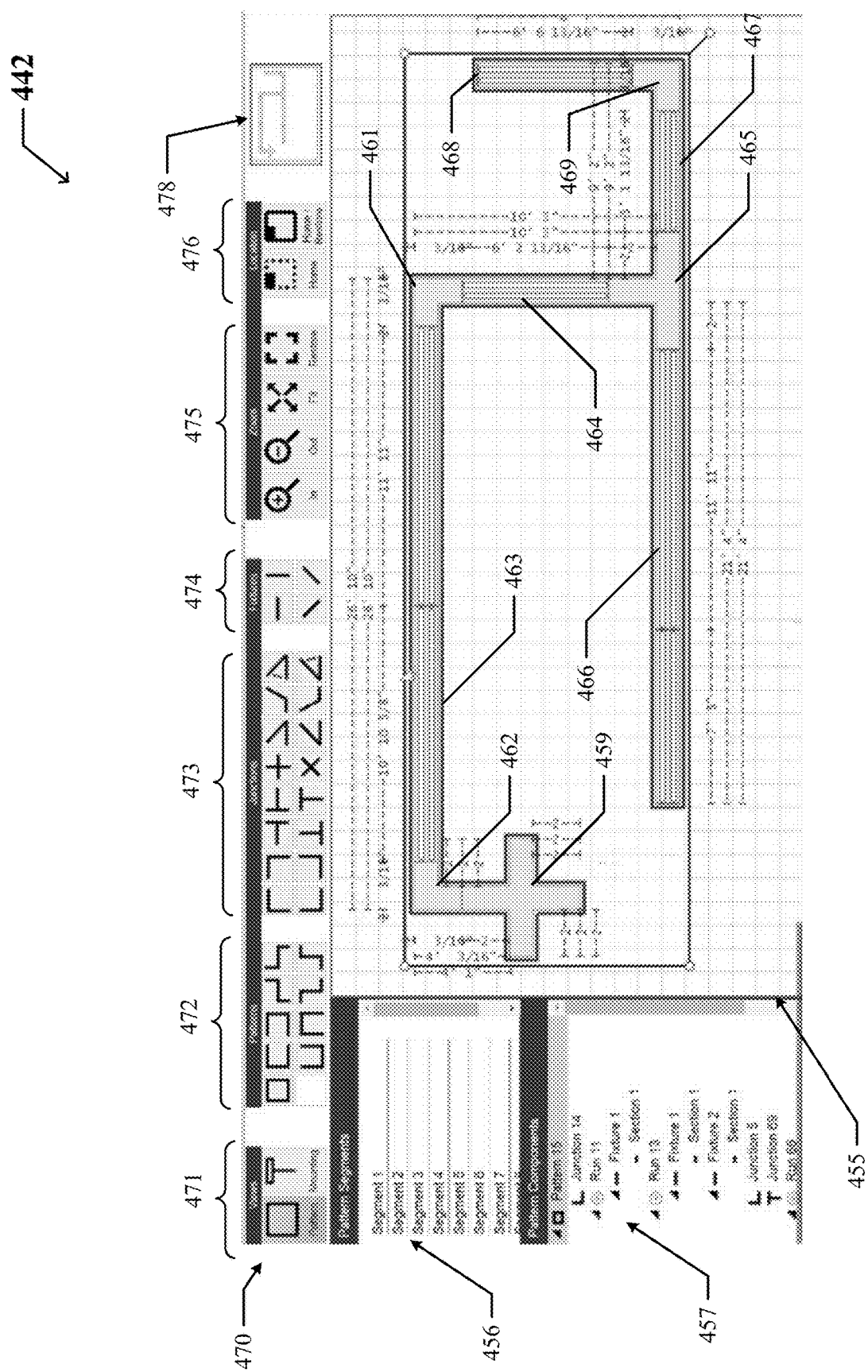

In FIG. 4E, cross junction 459 is added to the mapping area 455. Cross junction 459 is coupled to corner junction 462. Once again, the segment list 456 and the component list 457 are extended based on the addition of the cross junction 459 to the mapping area 455. The cross junction 459 is selected by a user from among the junction menu 473 in the selection menus 470. The summary window 478 is updated in real time to show this addition to the mapping area 455.

Figure 4F:
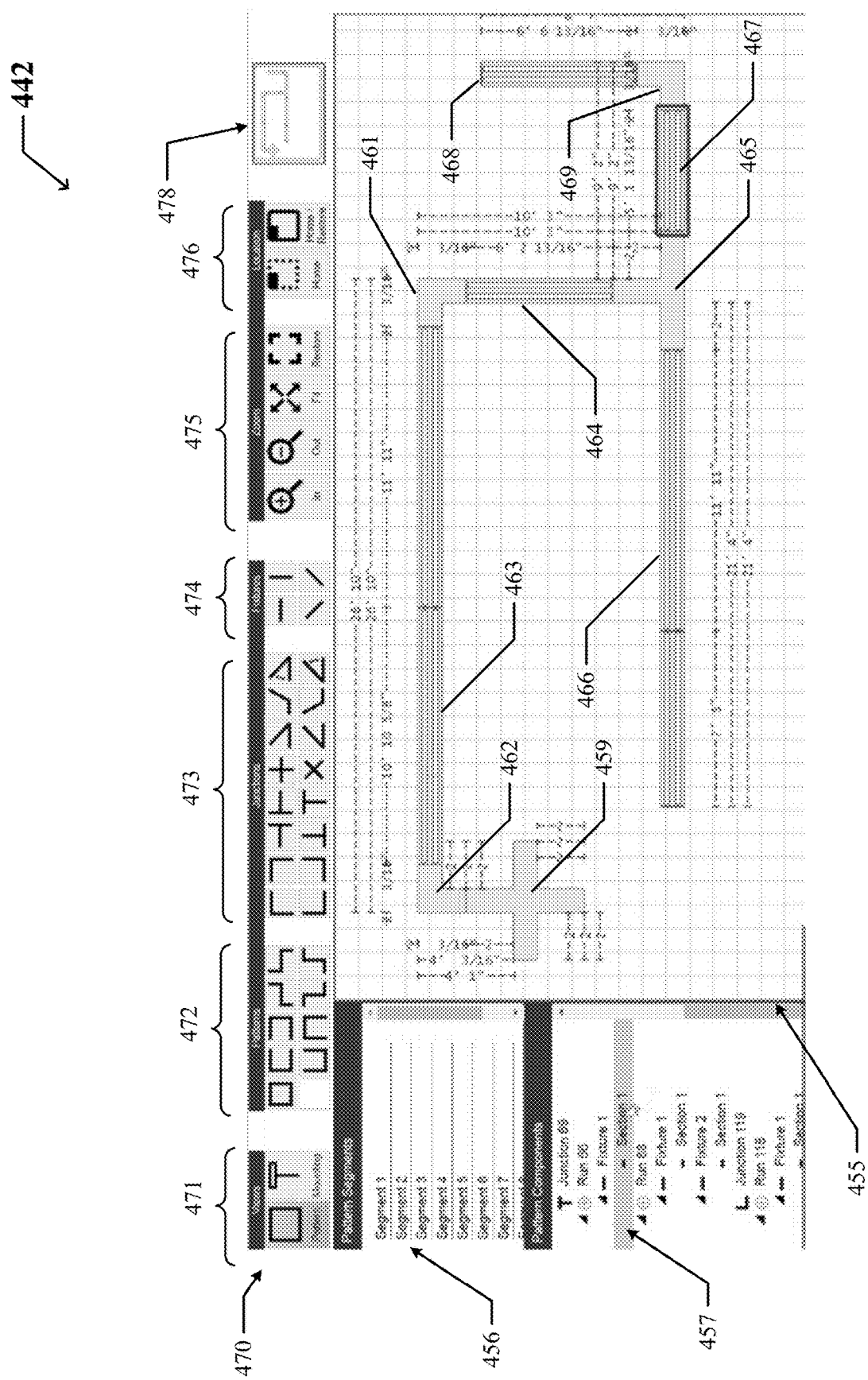
Figure 4G:
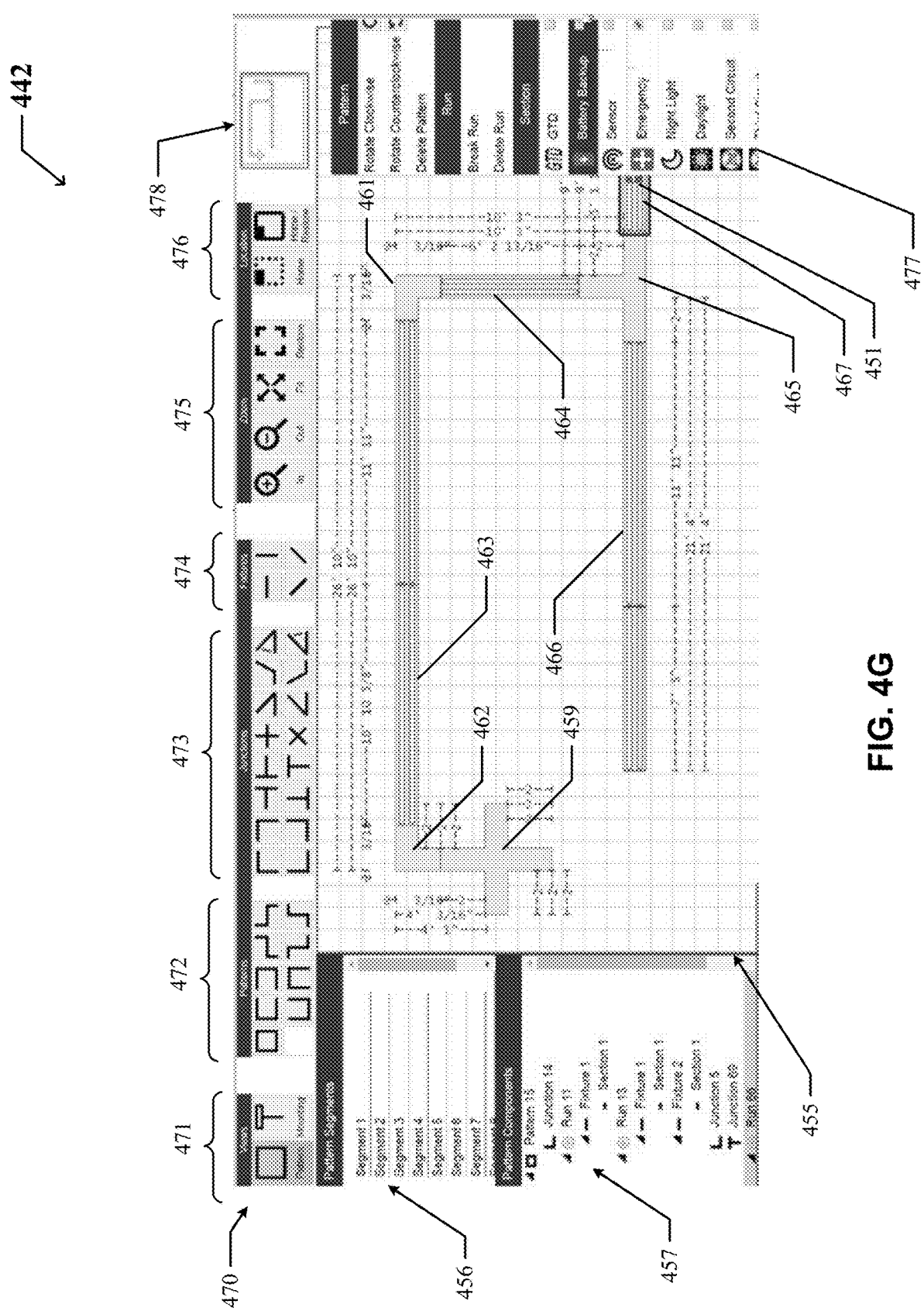

In FIG. 4F, linear fixture 467 is selected by a user to specify features of the linear fixture 467. The user in this case selects the linear fixture 467 from the component list 457. In other cases, the user can select the linear fixture 467 directly on the mapping area 455. In FIG. 4G, a feature menu 477 for linear fixture 467 appears on the mapping area 455, allowing the user to select various features that the linear fixture 467 can have. In this case, the user has selected that the linear fixture 467 is an emergency fixture, and the mapping area 455 shows an emergency 451 on the linear fixture 467 to confirm that the linear fixture 467 includes this feature.

Figure 4H:
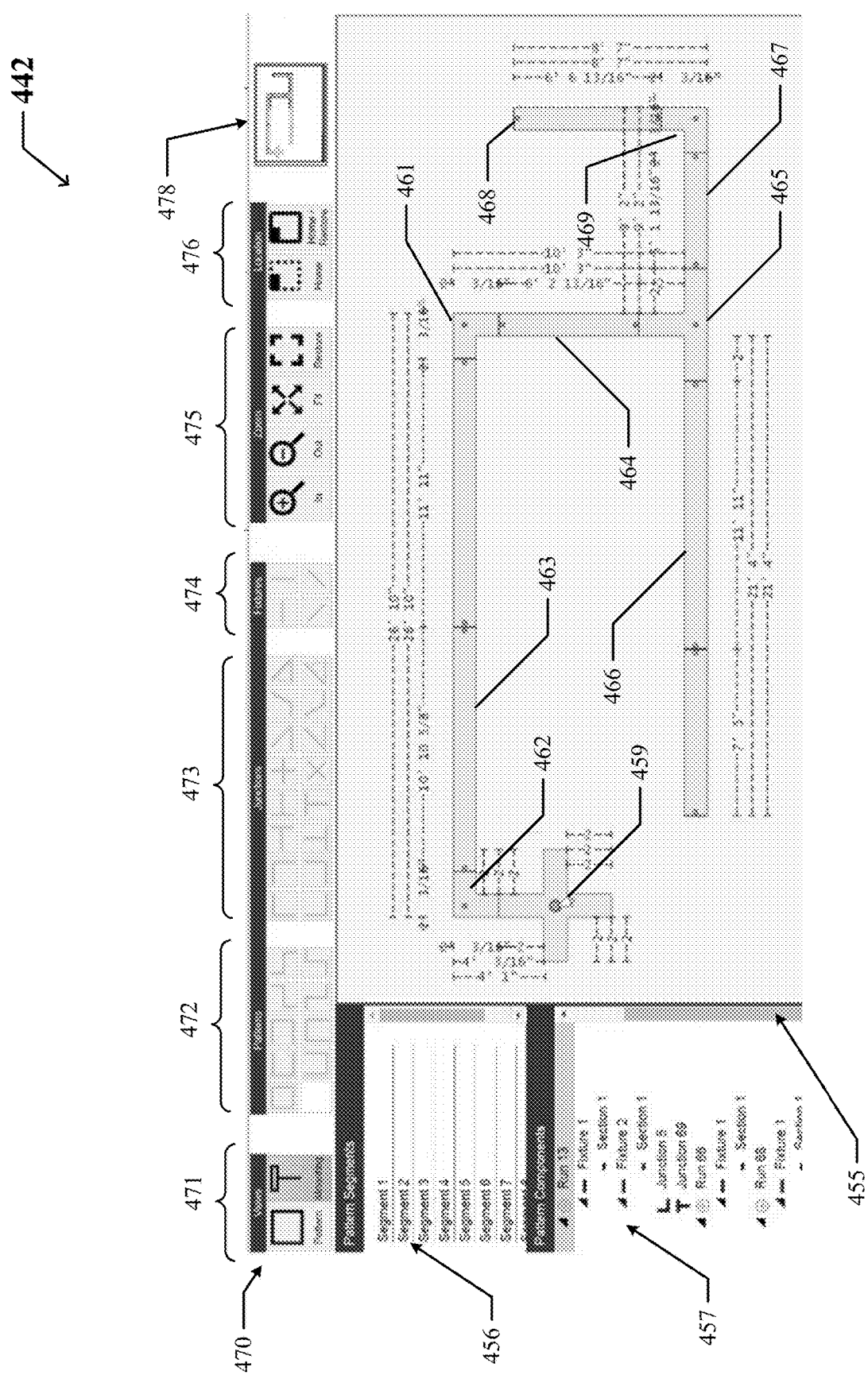

In FIG. 4H, the "mounting" option is selected in the viewing menu 471, and so in this example the pattern menu 472, the junction menu 473, and the fixture menu 474 are all inactive. When a component in the mapping area 455 is selected using, for example, the component list 457, one or more of a number of mounting options for that component. In this case, the T junction 465 is selected. The selection menu for mounting of T junction 465 can appear in any of a number of ways. For example, a new menu listing can become part of the selection menus 470. As another example, as in this case, a virtual button can appear on the T junction 465.

Figure 4I:
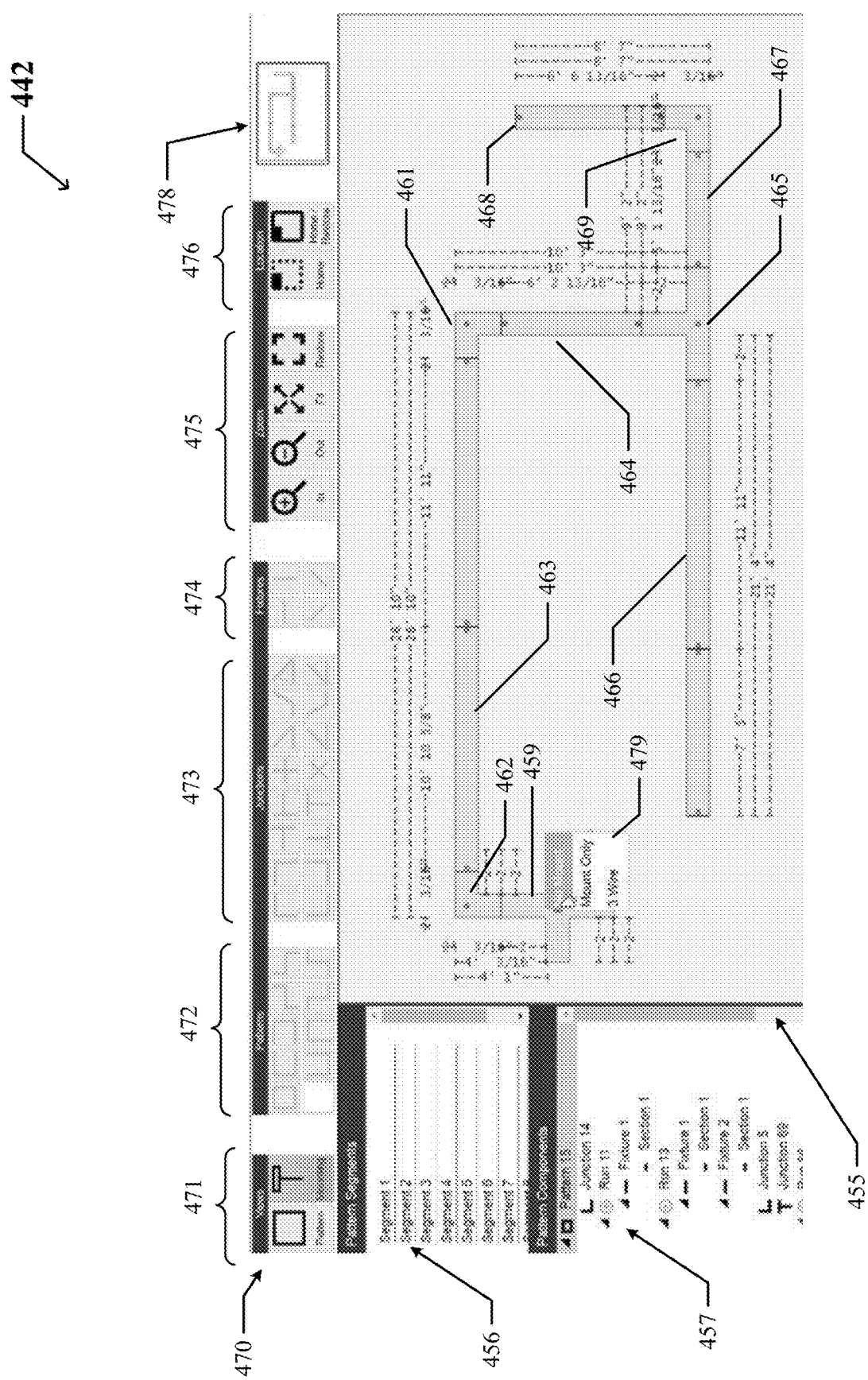

In FIG. 4I, the mounting menu is activated for the T junction 465, providing three mounting options: no mount, mount only, and 3 wire. In this case the ceiling configuration in the volume of space for which the proposed installation is targeted is known by the active configurator. For example, the active configurator can know whether the ceiling structure in the volume of space is a drop ceiling, a plaster ceiling, a lattice-work ceiling, a ceiling with exposed I-beams, or some other ceiling structure. This information can be provided by the user 250, one or more of the external systems 285, the storage repository 230, and/or one or more of the sensors 260.

Figure 4J:
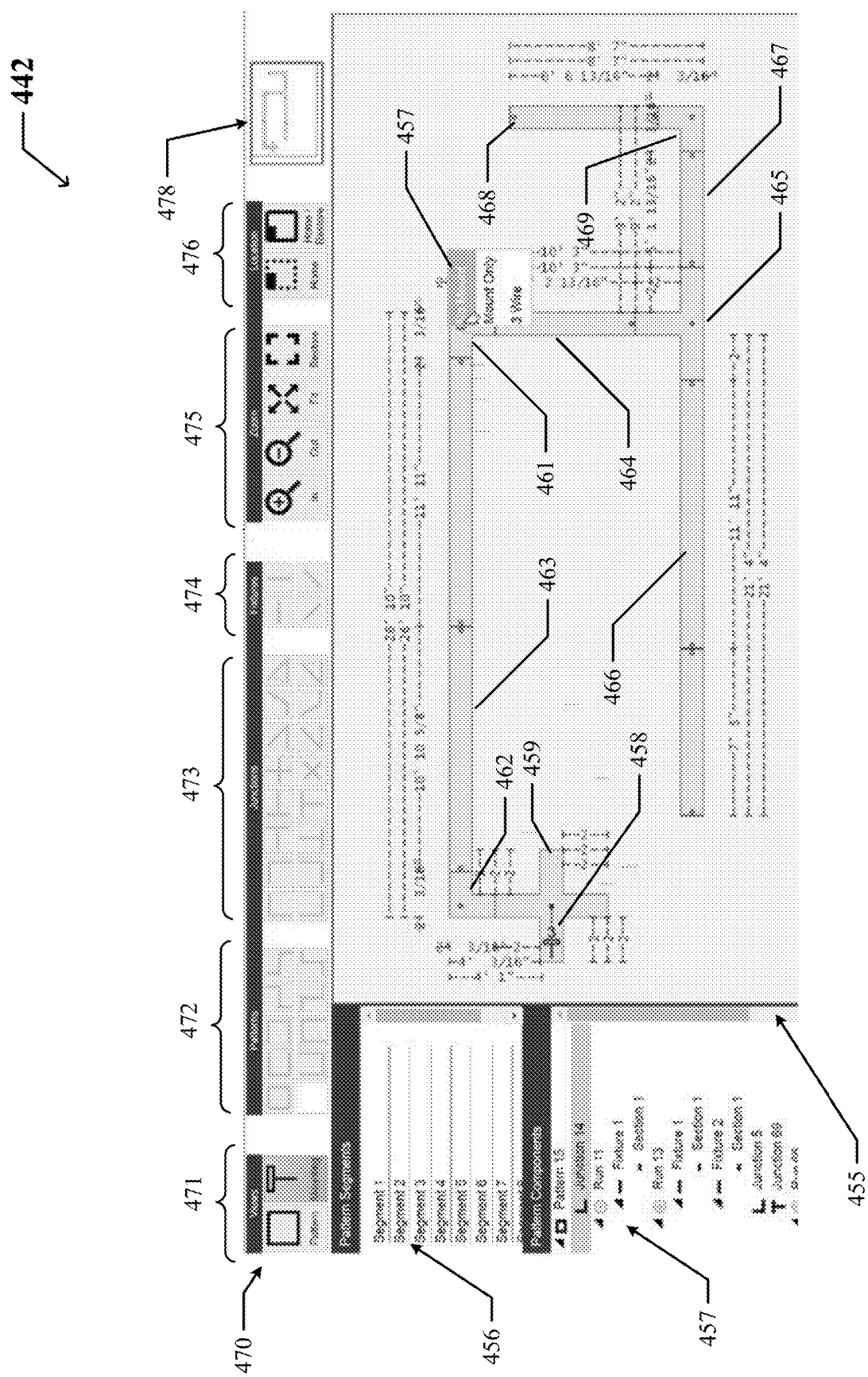

In FIG. 4J, the mapping area 455 shows that the 3 wire mounting option was chosen for the T junction 465. This information can also be updated in the component list 457. In addition, the user has selected a mapping menu for corner junction 461. The summary window 478 can be updated in real time to show the mounting selections. As stated above, this interface 442 of FIGS. 4A-4J is merely one of a large number of embodiments of how the interface can look, interact, and perform. All of the selections made by the user in this example can be called inputs to the active configurator.

Figure 5:
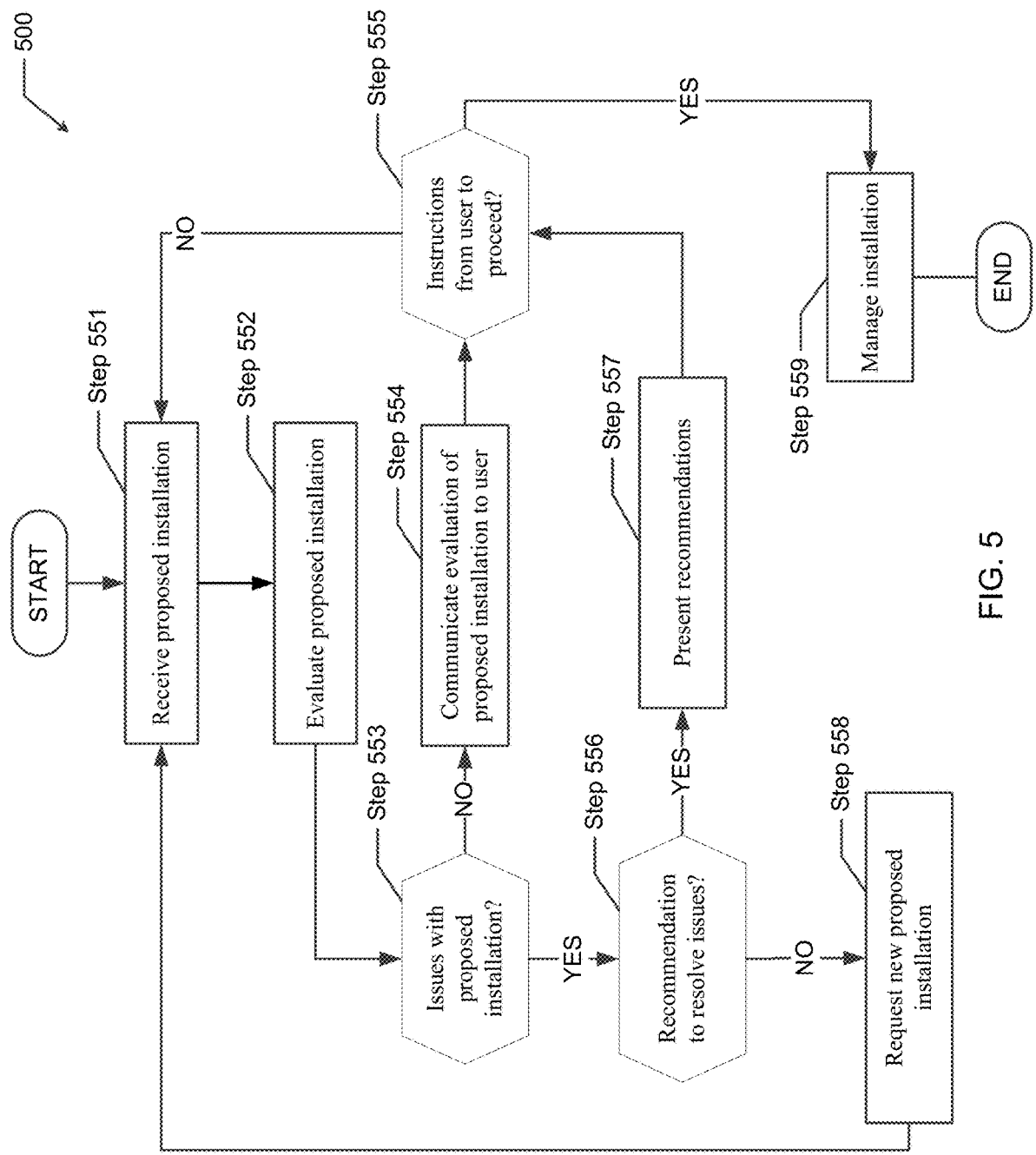
FIG. 5 shows a flowchart of a method for evaluating a potential installation in accordance with certain example embodiments.

FIG. 5 shows a flowchart of a method 500 for evaluating an installation in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 5 may be included in performing this method 500. Accordingly, the specific arrangement of steps should not be construed as limiting the scope. Further, a particular computing device, as described, for example, in FIG. 3 above, can be used to perform one or more of the steps (or portions thereof) for the method 500 described below in certain exemplary embodiments.

Referring now to FIGS. 1-5, the method 500 begins at the START step and proceeds to step 551, where a proposed installation is received. The proposed installation can be received by the active configurator 202, which can involve the use of an interface 242 and/or one or more sensors 260. The proposed installation can be for a complete system, part of a system, a piece of equipment, or any combination thereof. The proposed installation is made by a user 250. The proposed installation can be a new installation, a retrofit of an existing system, a modification to a previously proposed installation, or any other suitable type of installation.

In step 552, the proposed installation is evaluated. This evaluation is performed by portions of the active configurator 202. For example, the control engine 206 of the controller 204 of the active configurator 202 can coordinate and perform at least part of the evaluation. Other portions of the active configurator 202 that can assist in evaluating the proposed installation can include, but are not limited to, the mapping module 211, the compliance module 237, the budgeting module 238, and the inventory module 239. Information used to perform the evaluation of the proposed installation can be obtained from the storage repository 230 and/or from one or more of the external systems 285.

In step 553, a determination is made as to whether any issues with the proposed installation have arisen during the evaluation of the proposed installation. This determination can be made by the active configurator 202 or any portions (e.g., the control engine 206, the mapping module 211, the compliance module 237, the budgeting module 238, the inventory module 239) thereof. An issue can include one or more of a wide array of problems that the proposed installation can have. Examples of such problems can include, but are not limited to, a violation of a code or regulation, a lack of availability of parts, a lack of availability of labor, excessive price, insufficient expected longevity, and inferior expected performance. If there is an issue with the proposed installation, the process proceeds to step 556. If there is not an issue with the proposed installation, the process proceeds to step 554.

In step 554, an evaluation of the proposed installation is communicated. The evaluation can be communicated by the active configurator 202 to the user 250. The evaluation can include details about one or more aspects of the proposed installation. Such details can include, but are not limited to, vendors that would be providing equipment for the installation, contractors that would be performing the installation, a detailed estimated budget, and a detailed project schedule.

In step 555, a determination is made as to whether the user 250 has provided instructions to proceed with the proposed installation. The user can provide instructions to proceed with the proposed installation using the active configurator 202. If the user 250 has provided instructions to proceed with the proposed installation, then the process proceeds to step 559. If the user 250 has not provided instructions to proceed with the proposed installation, then the process reverts to step 551.

In step 556, a determination is made as to whether one or more recommendations can be made to resolve the issues identified in the proposed installation from step 553. The recommendations can include one or more alternatives, determined by the active configurator 202, that can overcome the issues that were identified. In some cases, the active configurator 202 may not be able to make any recommendations, either because the project itself is not feasible, or because resolving one issue causes another issue that cannot be resolved. If a recommendation can be made to resolve the issues, then the process proceeds to step 557. If a recommendation cannot be made to resolve the issues, then the process proceeds to step 558.

In step 557, the recommendations are presented. In such a case, the recommendations can be presented by the active configurator 202 to the user 250. These recommendations can be as minimal as a statement suggesting those one or more alternatives, or as extensive as providing an entirely new and complete proposed installation for each of the proposed alternatives. Once the recommendations have been presented, the process proceeds to step 555.

In step 558, a request for a new proposed installation is made. This request can be made by the active configurator 202 to the user 250. Accompanying this request can be information as to the one or more issues raised by the proposed installation (from step 553) and why those issues could not be resolved (from step 554). Once this step 558 is complete, the process reverts to step 551.

In step 559, the installation is managed. In certain example embodiments, the installation is managed, at least in part, by the active configurator 202. For example, the active configurator 202 can order equipment, schedule delivery of the equipment, schedule labor, submit requests for proposals, draft and execute contracts, make payments, make any necessary adjustments during the installation process, apply for permits, contact and schedule inspectors, provide status reports to the user 250, and manage testing of equipment. When step 559 is completed, the method 500 can proceed to the END step.

Example embodiments provide a number of benefits. Examples of such benefits include, but are not limited to, more intuitive and real-time feedback about a proposed installation of a system or equipment, or the effect of a change in in such a proposed installation. Example embodiments can be used with new installations or with retrofitting of existing systems or equipment. Example embodiments can provide a wide array of information, such as inventory information, scheduling information, pricing information, regulatory or code issues. Example embodiments can also identify problems with a proposed installation, generate alternatives, and evaluate those alternatives. Example embodiments can also provide project management services for the installation. Example embodiments can also provide an interactive interface with a user to build and modify the proposed installation in real time.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An active configurator comprising:
   an interface comprising a plurality of fixture selections and a map of a volume of space;
   at least one sensor that identifies a size and location of at least one object in the volume of space; and
   a controller coupled to the interface and to the at least one sensor, wherein the controller:
   receives, via the interface, a first fixture selection from among the plurality of fixture selections;
   receives, via the interface, a first position selection on the map of the volume of space;
   imposes the first fixture selection at the first position selection on the map of the volume of space;
   receives, via the interface, a second fixture selection from among the plurality of fixture selections;
   receives, via the interface, a second position selection on the map of the volume of space;
   imposes the second fixture selection at the second position selection on the map of the volume of space;
   receives, via the interface, a third fixture selection from among the plurality of fixture selections;
   receives, via the interface, a third position selection on the map of the volume of space, wherein the third position selection is located between the first position selection and the second position selection;
   imposes the third fixture selection at the third position selection on the map of the volume of space;
   identifies, using the at least one sensor, a size and a location of at least one object in the volume of space;
   identifies, in real time and using the mapping module, a budgeting module, and an inventory module, at least one light fixture that corresponds to the first fixture selection at the first position selection, the second fixture selection at the second position selection, and the third fixture selection at the third position selection, wherein the mapping module uses the size and the location of the at least one object when identifying the at least one light fixture, wherein the inventory module identifies available inventory of the at least one light fixture, wherein the budgeting module identifies a cost of the at least one light fixture;
   identifies, using the mapping module and in real time, engineering requirements for installing the at least one light fixture in the volume of space; and
   presents, using the interface and in real time, an installation plan for installing the at least one light fixture in the volume of space, wherein the installation plan meets the engineering requirements.

2. The active configurator of claim 1, further comprising:
   at least one additional sensor coupled to the controller, wherein the at least one additional sensor measures at least one parameter used to identify the first position selection on the map.

3. The active configurator of claim 1, wherein the controller identifies a problem with the at least one light fixture, identifies at least one solution to resolve the problem, and presents the at least one solution to the user.

4. The active configurator of claim 3, wherein the problem is associated with a code violation.

5. The active configurator of claim 3, wherein the problem is associated with a conflict with existing equipment.

6. The active configurator of claim 3, wherein the problem is associated with available inventory.

7. The active configurator of claim 3, wherein the problem is associated with a budgetary constraint.

8. The active configurator of claim 1, wherein the controller further:
   receives approval through the interface to proceed with the installation plan; and
   manages implementation of the installation plan.

9. The active configurator of claim 1, wherein the controller further:
   analyzes, in real time using a light analysis module, an overall light output of the first fixture selection at the first position selection, the second fixture selection at the second position selection, and the third fixture selection at the third position selection; and determines, in real time using the light analysis module, whether the overall light output satisfies minimal requirements for the volume of space, wherein the at least one light fixture is identified further based on determining that the overall light output satisfies minimal requirements.

10. A system for generating a proposed installation in a volume of space, the system comprising:

at least one external system; and an active configurator communicably coupled to the at least one external system, wherein the active configurator comprises:

a hardware processor;

an interface comprising a plurality of fixture selections and a map of a volume of space;

at least one sensor that measures at least one parameter; and a control engine communicably coupled to the interface and to the at least one sensor, wherein the control engine executes instructions on the hardware processor to:

receive, via the interface, a first fixture selection from among the plurality of fixture selections;

receive, via the interface, a first position selection on the map of the volume of space;

identify the first position selection on the map based on the at least one parameter measured by the at least one sensor;

impose the first fixture selection at the first position selection on the map of the volume of space;

receive, via the interface, a second fixture selection from among the plurality of fixture selections;

receive, via the interface, a second position selection on the map of the volume of space;

identify the second position selection on the map based on the at least one parameter measured by the at least one sensor;

impose the second fixture selection at the second position selection on the map of the volume of space;

receive, via the interface, a third fixture selection from among the plurality of fixture selections;

receive, via the interface, a third position selection on the map of the volume of space, wherein the third position selection is located between the first position selection and the second position selection;

identify the third position selection on the map based on the at least one parameter measured by the at least one sensor;

impose the third fixture selection at the third position selection on the map of the volume of space;

identify, in real time, at least one light fixture that corresponds to the first fixture selection at the first position selection, the second fixture selection at the second position selection, and the third fixture selection at the third position selection;

identify, in real time, engineering requirements for installing the at least one light fixture in the volume of space; and present, using the interface and in real time, an installation plan for installing the at least one light fixture in the volume of space, wherein the installation plan meets the engineering requirements.

11. The system of claim 10, wherein the active configurator further comprises:

a mapping module communicably coupled to the control engine, wherein the mapping module identifies the engineering requirements.

12. The system of claim 10, wherein the active configurator further comprises:

a budgeting module communicably coupled to the control engine, wherein the budgeting module evaluates the cost of the at least one light fixture and determines whether a cost of the at least one light fixture-is within budgetary parameters.

13. The system of claim 10, wherein the active configurator further comprises:

an inventory module communicably coupled to the control engine, wherein the inventory module determines an available inventory of the at least one light fixture.

14. The system of claim 10, wherein the active configurator further comprises:

a compliance module communicably coupled to the control engine, wherein the compliance module determines whether the at least one light fixture complies with applicable code requirements.

15. The system of claim 10, wherein the active configurator further comprises:

at least one sensor communicably coupled to the control engine, wherein the at least one sensor measures at least one parameter used to identify the first position selection on the map.

16. The system of claim 10, wherein the active configurator further comprises:

at least one sensor communicably coupled to the control engine, wherein the at least one sensor determines a characteristic of the volume of space.

17. The system of claim 10, wherein the interface comprises a touchscreen.

18. A computer readable medium comprising computer readable program code embodied therein for a method for generating a proposed lighting installation in a volume of space using an active configurator, the method comprising:

receiving, via an interface, a first fixture selection from among the plurality of fixture selections;

receiving, via the interface, a first position selection on the map of the volume of space;

identifying the first position selection on the map based on at least one parameter measured by at least one sensor;

imposing the first fixture selection at the first position selection on the map of the volume of space;

receiving, via the interface, a second fixture selection from among the plurality of fixture selections;

receiving, via the interface, a second position selection on the map of the volume of space;

imposing the second fixture selection at the second position selection on the map of the volume of space;

receiving, via the interface, a third fixture selection from among the plurality of fixture selections;

receiving, via the interface, a third position selection on the map of the volume of space, wherein the third position selection is located between the first position selection and the second position selection;

imposing the third fixture selection at the third position selection on the map of the volume of space;

identifying, in real time, at least one light fixture that corresponds to the first fixture selection at the first position selection, the second fixture selection at the second position selection, and the third fixture selection at the third position selection;

identifying, in real time, engineering requirements for installing the at least one light fixture in the volume of space; and presenting, using the interface and in real time, the proposed lighting installation in the form of the at least one light fixture in the volume of space, wherein the proposed lighting installation meets the engineering requirements.

19. The computer readable medium of claim 18, wherein the method further comprises:

identifying a problem with the at least one light fixture;

evaluating at least one alternative that addresses the problem; and recommending at least one viable alternative to overcome the problem.

20. The computer readable medium of claim 18, wherein the at least one light fixture has a non-standard length.

\* \* \* \* \*